US011120555B2

(12) United States Patent
Miyamoto

(10) Patent No.: US 11,120,555 B2
(45) Date of Patent: Sep. 14, 2021

(54) IMAGE PROCESSOR, IMAGE PROCESSING METHOD, PROGRAM, AND REMOTE COMMUNICATION SYSTEM

(71) Applicant: SONY CORPORATION, Tokyo (JP)

(72) Inventor: Kohei Miyamoto, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/639,386

(22) PCT Filed: Aug. 9, 2018

(86) PCT No.: PCT/JP2018/029877
§ 371 (c)(1),
(2) Date: Feb. 14, 2020

(87) PCT Pub. No.: WO2019/039296
PCT Pub. Date: Feb. 28, 2019

(65) Prior Publication Data
US 2020/0258232 A1 Aug. 13, 2020

(30) Foreign Application Priority Data
Aug. 23, 2017 (JP) .............................. JP2017-160167

(51) Int. Cl.
G06T 7/11 (2017.01)
G06T 7/50 (2017.01)
(Continued)

(52) U.S. Cl.
CPC .............. G06T 7/11 (2017.01); G06K 9/4652 (2013.01); G06K 9/4661 (2013.01); G06T 7/50 (2017.01);
(Continued)

(58) Field of Classification Search
CPC ..... G06T 7/11; G06T 7/50; G06T 7/90; G06T 2207/10024; G06T 2207/10028;
(Continued)

(56) References Cited

U.S. PATENT DOCUMENTS 8,018,494 B2* 9/2011 Yokomitsu ......... G06K 9/00771
348/208.14
2015/0171146 A1* 6/2015 Ooki ................. H01L 27/14623
250/208.1
(Continued)

FOREIGN PATENT DOCUMENTS

| CN | 101371271 A | 2/2009 |
| JP | H08-046990 A | 2/1996 |

(Continued)

OTHER PUBLICATIONS

Ohya et al., Natural color reproduction method and its application for telemedicine, ITE Technical Report, May 26, 1998, pp. 31-36, vol. 22, No. 26.

(Continued)

Primary Examiner — Ali Bayat
(74) Attorney, Agent, or Firm — Paratus Law Group, PLLC

(57) ABSTRACT

There is provided an image processor, an image processing method, a program, and a remote communication system that make it possible to provide a more satisfactory user experience. A region segmentation section segments an image at another base into a plurality of regions, and an estimation section estimates a lighting environment in which the image at the other base has been captured, by performing an image analysis on the image as a whole at the other base and on each region in the image at the other base. Then, the color correction section performs color correction, in accordance with a light-source color at the self base, on the image at the other base that has a light-source color corresponding (Continued)

to the lighting environment. For example, the present technology is applicable to a remote communication system using an image received and transmitted between the other base and the self base.

18 Claims, 23 Drawing Sheets

(51) Int. Cl.
*G06T 7/90* (2017.01)
*G06K 9/46* (2006.01)

(52) U.S. Cl.
CPC ...... *G06T 7/90* (2017.01); *G06T 2207/10024* (2013.01)

(58) Field of Classification Search
CPC ...... G06T 1/00; G06K 9/4652; G06K 9/4661; G06K 9/34; H04N 1/60; H04N 7/14; H04N 9/07
USPC ......................................................... 382/173
See application file for complete search history.

(56) References Cited

U.S. PATENT DOCUMENTS

| | | | |
|---|---|---|---|
| 2015/0187093 A1* | 7/2015 | Chu | G06T 11/001 345/426 |
| 2017/0019651 A1* | 1/2017 | Kitajima | H04N 9/07 |
| 2018/0144446 A1* | 5/2018 | Morifuji | G09G 5/026 |
| 2018/0260975 A1* | 9/2018 | Sunkavalli | G06T 7/00 |

FOREIGN PATENT DOCUMENTS

| | | |
|---|---|---|
| JP | 2010-263584 A | 11/2010 |
| JP | 2011-165091 A | 8/2011 |

OTHER PUBLICATIONS

Yamaguchi et al., Natural color reproduction in the television system for telemedicime, Proceedings of SPIE, Medical Imaging 1997: Image Display, May 7, 1997, pp. 482-489, vol. 3031, Newport Beach, CA, United States.

\* cited by examiner

FIG. 2
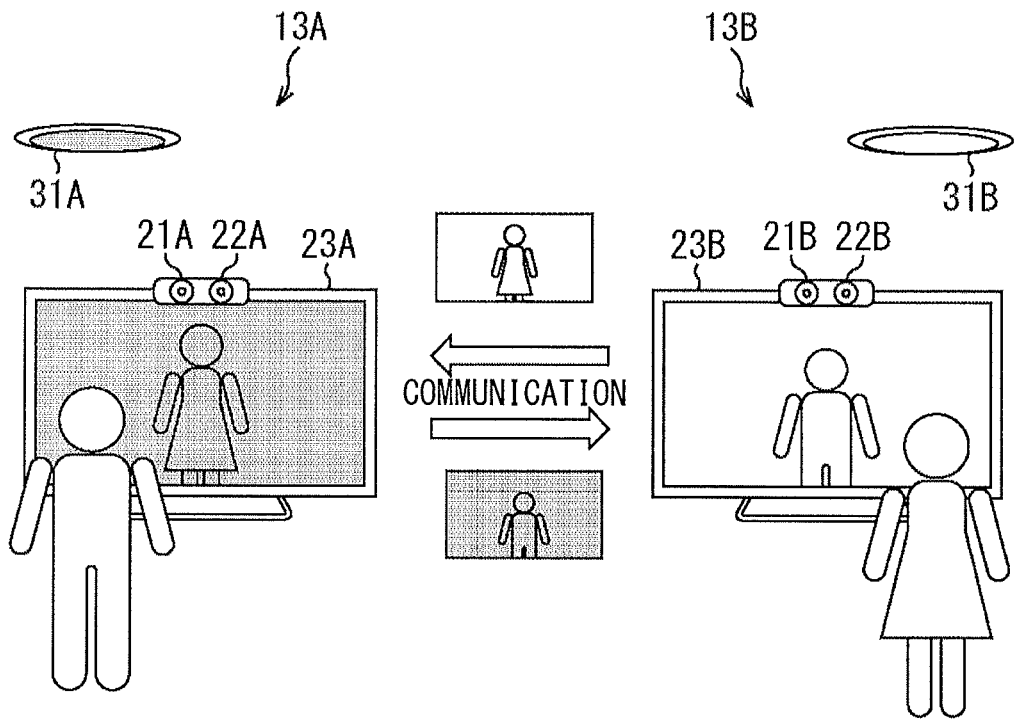
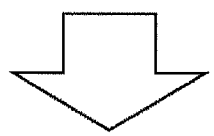
CHANGE COLOR OF LIGHTING
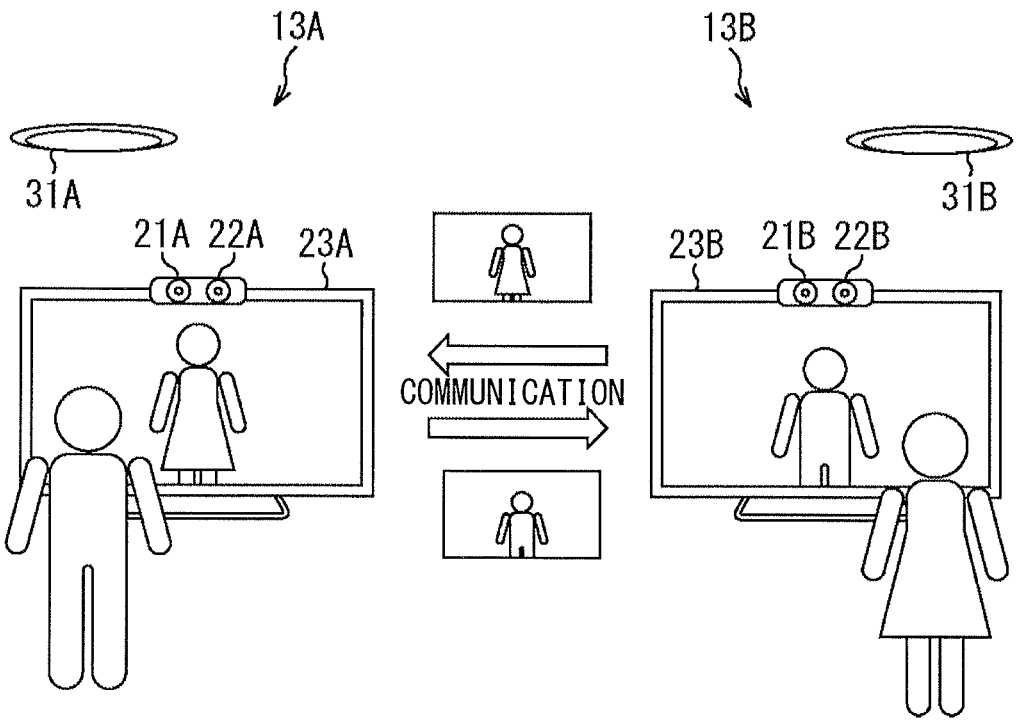

FIG. 6
A
RGB IMAGE DEPTH INFORMATION
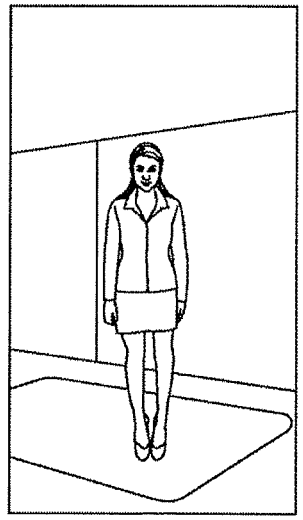
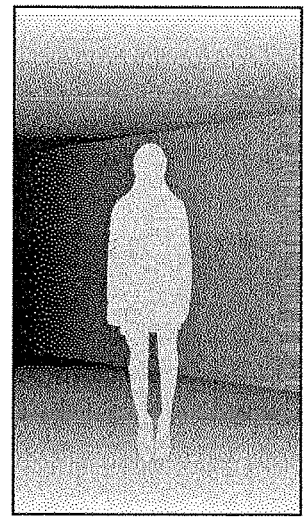
B
RGB IMAGE HUMAN MASKING INFORMATION
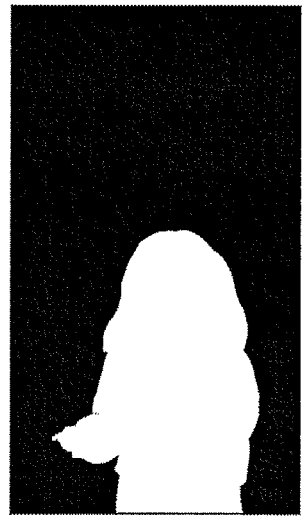

FIG. 8

| ASSUMPTION | REGARDING WEIGHT VALUE |
|---|---|
| WALL, CEILING, ETC. HAVE SMALLER HIGH-FREQUENCY COMPONENT | ASSIGN LARGER WEIGHT TO REGION HAVING SMALLER HIGH-FREQUENCY COMPONENT |
| WALL, CEILING, ETC. HAVE LARGER REGION SIZE | ASSIGN LARGER WEIGHT TO REGION HAVING LARGER SIZE |
| LIGHT SOURCE USUALLY USED IN ROOM IS OFTEN 2700K TO 6500K | ASSIGN LARGER WEIGHT TO REGION HAVING COLOR CLOSER TO WHITE POINT OF WHITE LED OF 2700K TO 6500K |
| OBJECT HAVING COLOR CLOSER TO WHITE REFLECTS LIGHT-SOURCE COLOR MORE EASILY | ASSIGN LARGER WEIGHT TO REGION HAVING COLOR CLOSER TO THE COLOR OF D65 WHITE POINT |

IMAGE PROCESSOR, IMAGE PROCESSING METHOD, PROGRAM, AND REMOTE COMMUNICATION SYSTEM

CROSS REFERENCE TO PRIOR APPLICATION

This application is a National Stage Patent Application of PCT International Patent Application No. PCT/JP2018/029877 (filed on Aug. 9, 2018) under 35 U.S.C. § 371, which claims priority to Japanese Patent Application No. 2017-160167 (filed on Aug. 23, 2017), which are all hereby incorporated by reference in their entirety.

TECHNICAL FIELD

The present disclosure relates to an image processor, an image processing method, a program, and a remote communication system, and relates particularly to an image processor, an image processing method, a program, and a remote communication system that make it possible to provide a more satisfactory user experience.

BACKGROUND ART

A remote communication system that allows users each present at a remote place to communicate with each other as if the users are facing each other has been developed. Such a remote communication system, through use of an image that makes each user feel like being in the same space, for example, through use of an image that looks as if light at a side of one user is also illuminating a side of a partner, makes it possible to provide a satisfactory user experience that produces a higher sense of presence. This makes it possible to provide a satisfactory user experience that produces a higher sense of presence.

For example, PTL 1 discloses a color-tone adjustment apparatus that performs color correction on the basis of a result of a prior estimation of a light-source color using a calibration board, and color correction on the basis of the result of the estimation of the light-source color using an image in a frame (one or more frames) specified by a user.

CITATION LIST

Patent Literature

PTL 1: Japanese Unexamined Patent Application Publication No. 2011-165091

SUMMARY OF THE INVENTION

Problem to be Solved by the Invention

However, in color correction disclosed in the foregoing PTL 1, a color tone of an image can become unnatural depending on a result of a prior estimation, a user specification, etc., which can result in deteriorating a sense of presence. There is a possibility that a remote communication system using such an image fails to provide a satisfactory user experience.

The present disclosure, conceived in view of such a situation, makes it possible to provide a more satisfactory user experience.

Means for Solving the Problem

An image processor according to an embodiment of the present disclosure includes a region segmentation section that segments, in remote communication using an image received and transmitted between another base and a self base, the image at the other base into a plurality of regions, an estimation section that estimates, by performing an image analysis on the image as a whole at the other base and on each of the plurality of regions at the other base, a lighting environment in which the image at the other base has been captured, and a color correction section that performs color correction, in accordance with the light-source color at the self base, on the image at the other base that has a light-source color corresponding to the lighting environment.

An image processing method in an embodiment of the present disclosure is used in an image processor that processes, in remote communication using an image received and transmitted between another base and a self base, the image at the other base. The image processing method includes segmenting the image at the other base into a plurality of regions, estimating, by performing an image analysis on the image as a whole at the other base and on each of the plurality of regions in the image at the other base, a lighting environment in which the image at the other base has been captured, and performing color correction, in accordance with the light-source color at the self base, on the image at the other base that has a light-source color corresponding to the lighting environment.

A program in an embodiment of the present disclosure causes a computer in an image processor to execute image processing. The image processor, in remote communication using an image received and transmitted between another base and a self base, processes the image at the other base. The image processing includes segmenting the image at the other base into a plurality of regions, estimating, by performing an image analysis on the image as a whole at the other base and on each of the plurality of regions in the image at the other base, a lighting environment in which the image at the other base has been captured, and performing color correction, in accordance with the light-source color at the self base, on the image at the other base that has a light-source color corresponding to the lighting environment.

A remote communication system in an embodiment of the present disclosure is configured by coupling thereto, via a network, an image processor that includes a reception-transmission section and a color correction section. The reception-transmission section receives and transmits an image between another base and a self base. The color correction section performs color correction on the image at the other base that has a light-source color corresponding to a lighting environment in which the image at the other base has been captured. The lighting environment is estimated by segmenting, into a plurality of regions, the image at the other base in remote communication using the image received and transmitted, and then performing an image analysis on the image as a whole at the other base and on each of the plurality of regions in the image at the other base.

In an embodiment of the present disclosure, an image at the other base is segmented into a plurality of regions, and a lighting environment in which the image at the other base has been captured is estimated by performing an image analysis on the image as a whole at the other base and on each of the plurality of regions in the image at the other base, and color correction is performed, in accordance with the light-source color at the self base, on the image at the other base that has a light-source color corresponding to the lighting environment.

Effects of the Invention

According to an embodiment of the present disclosure, it is possible to provide a more satisfactory user experience.

It is to be noted that the effects described here are not necessarily limitative, but may be any of the effects described in the present disclosure.

BRIEF DESCRIPTION OF DRAWINGS

FIG. 2 is a diagram that describes color correction in response to a change in a light-source color.

FIG. 6 is a diagram that illustrates an example of depth information and human masking information.

FIG. 8 is a diagram that describes a size of a weight value that is used in estimating a white point.

MODES FOR CARRYING OUT THE INVENTION

In the following, specific embodiments to which the present technology is applied are described with reference to drawings.

<Configuration Example of Remote Communication System>

Figure 1:
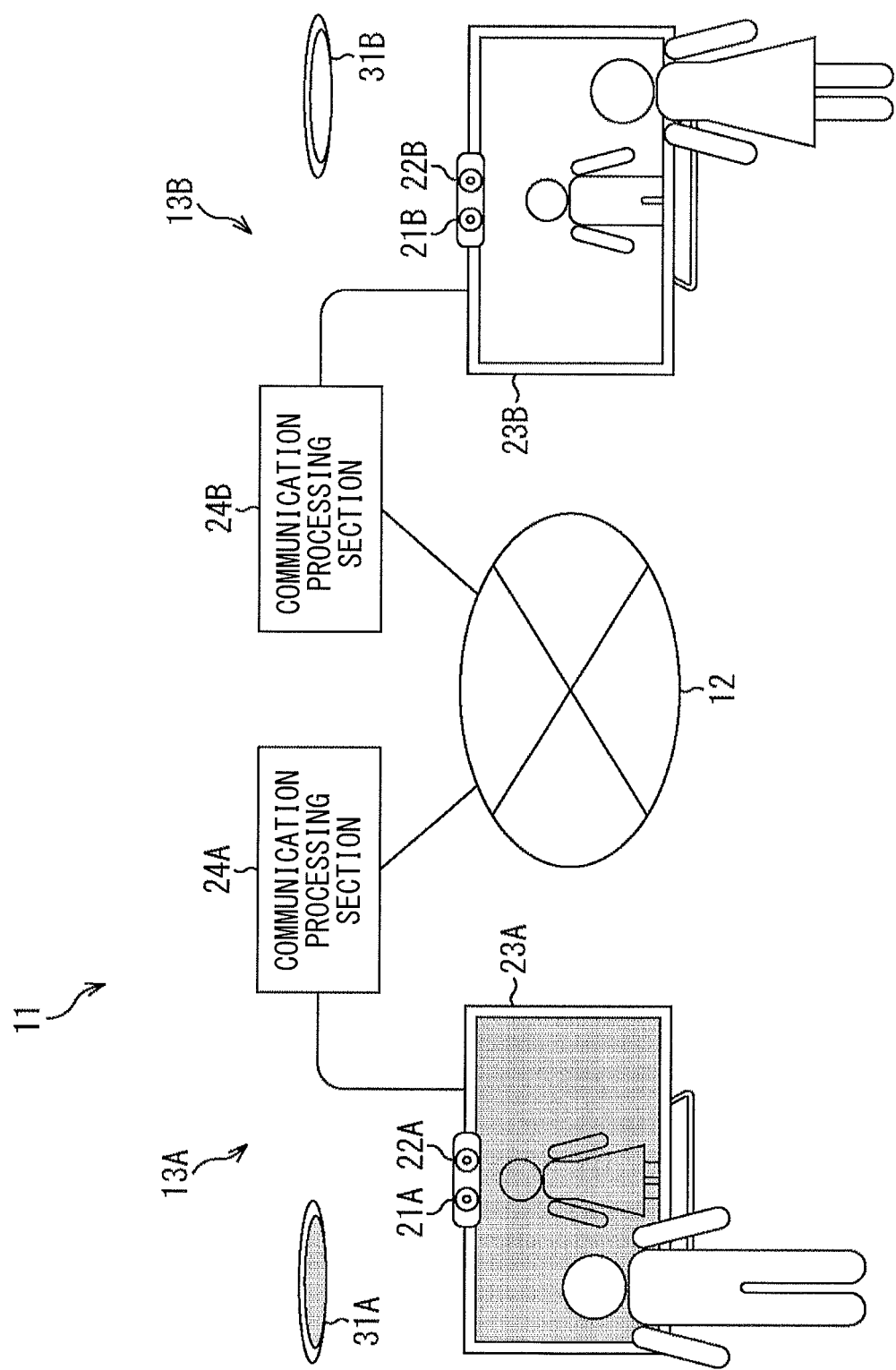
FIG. 1 is a block diagram that illustrates a configuration example of an embodiment of a remote communication system to which the present technology is applied.

FIG. 1 is a block diagram that illustrates a configuration example of an embodiment of a remote communication system to which the present technology is applied.

As illustrated in FIG. 1, a remote communication system 11 is configured by coupling thereto, via a network 12 such as the Internet, communication terminals 13A and 13B each located at a remote place.

For example, in the remote communication system 11, the communication terminals 13A and 13B are coupled to each other via the network 12, thus enabling mutual reception and transmission of an image and a sound in real time. This allows a user A on a side of the communication terminal 13A and a user B on a side of the communication terminal 13B to talk with each other as if the users are facing each other, thus enabling more real communication.

It is to be noted that the communication terminals 13A and 13B each have a similar configuration, and in a case where it is not necessary to distinguish these from each other, these are simply referred to as a communication terminal 13, and each section included in the communication terminals 13A and 13B is referred to likewise. In addition, in the following, of communication processing performed in the communication terminal 13, only image-related processing is described, and a description of sound-related processing is omitted.

In addition, a user on the side of the communication terminal 13 (for example, the user A with respect to the communication terminal 13A or the user B with respect to the communication terminal 13B) is referred to as a user at a self-base. Then, a user that is a communication partner of the user (for example, the user B with respect to the communication terminal 13A, or the user A with respect to the communication terminal 13B) is referred to as a user at another base.

Figure 22:
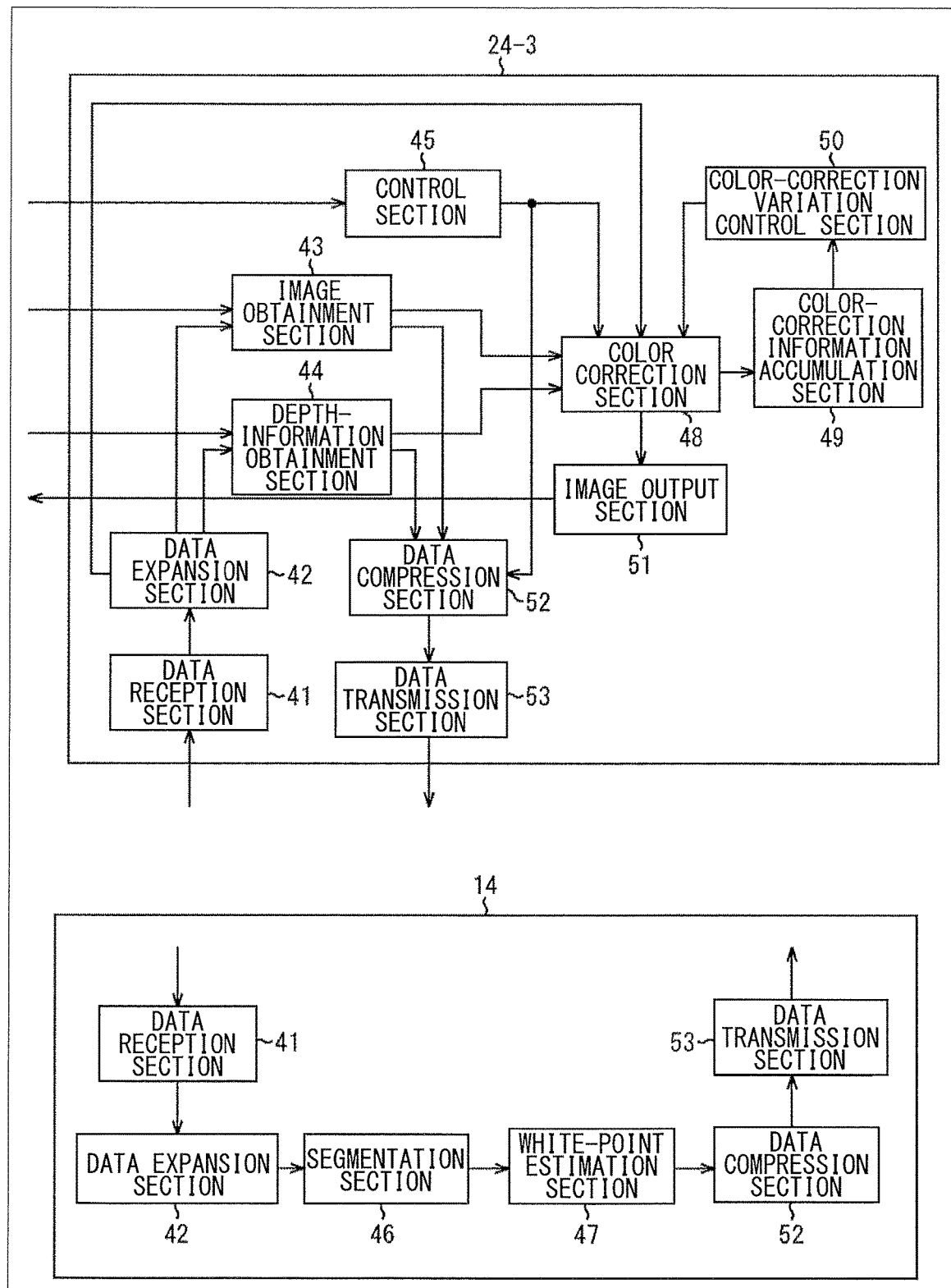
FIG. 22 is a block diagram that illustrates a third configuration example of a communication processing section.

Thus, the remote communication system 11 is configured by directly coupling at least two or more bases, and is able to provide remote communication by the communication terminal 13. For example, each communication terminal 13 has a function to, at the self base, transmit an image to the other base and receive an image transmitted from the other base, and perform image processing on the image and display the image. It is to be noted that the remote communication system 11 may have a configuration in which the other base and the self base are indirectly coupled to each other via a server 14 described later and as illustrated in FIG. 22.

The communication terminal 13 includes an RGB sensor 21, a depth sensor 22, a display apparatus 23, and a communication processing section 24.

The RGB sensor 21, for example, includes an imaging element that captures an image of a front area of the display apparatus 23. For example, the RGB sensor 21 supplies the communication processing section 24 with an RGB image signal that is obtained by capturing an image of the user at the self base.

The depth sensor 22, for example, includes a TOF (Time Of Flight) sensor that emits a pulsed infrared ray toward an imaging range in which the image is captured by the RGB sensor 21 and measures a distance on the basis of time from when the infrared ray is reflected at an object to when the infrared ray returns. In addition, the depth sensor 22 supplies the communication processing section 24 with a depth signal that indicates a distance from the depth sensor 22 to the object.

The display apparatus 23, for example, includes a display device such as a liquid crystal panel or an organic EL (electroluminescence) panel, and displays, for example, an image including the user at the other base, in accordance with an image signal supplied from the communication processing section 24.

The communication processing section 24 performs various types of processing that is necessary for performing communication, such as communication processing to perform communication via the network 12 or image processing to allow users to perform satisfactory communication with each other. For example, the communication processing section 24 is able to perform image processing that corrects, in accordance with a light-source color corresponding to a lighting environment at the self base, an image at the other base that has been captured under a light-source color corresponding to a lighting environment at the other base.

An example illustrated in FIG. 1 assumes that the light-source color of a lighting device 31A that illustrates a room where the communication terminal 13A is provided is a warm color, and the light-source color of a lighting device 31B that illuminates a room where the communication terminal 13B is provided is a cold color. Thus, in a case where a different light-source color is provided at each base, the communication processing section 24 is able to perform color correction on the image that is to be displayed in the display apparatus 23, on the basis of a result of an image analysis performed on the image at each of the self base and the other base.

In other words, to the communication terminal 13A, an image of the user B that has been captured under a lighting environment illuminated with light having a cold color is transmitted from the communication terminal 13B. At this time, the light-source color of the lighting device 31A is a warm color, thus allowing the communication processing section 24A to perform color correction on the image to cause the image to be displayed in a warm color. Likewise, to the communication terminal 13B, an image of the user A that has been captured under the lighting environment illuminated with light having a warm color is transmitted from the communication terminal 13A. At this time, the light-source color of the lighting device 31B is a cold color, thus allowing the communication processing section 24B to perform color correction on the image to cause the image to be displayed in a cold color.

Accordingly, in the communication terminal 13A, the display apparatus 23A displays an image on which color correction to a warm color has been performed, and the user A views the image under the lighting environment illuminated with the light having a warm color by the lighting device 31A. Likewise, in the communication terminal 13B, the display apparatus 23B displays an image on which color correction to a cold color has been performed, and the user B views the image under the lighting environment illuminated with light having a cold color by the lighting device 31B.

Thus, the communication terminal 13A makes it possible to display, in the display apparatus 23A, an image having a similar type of color as if the user B is also illuminated with the light from the lighting device 31A, thus allowing the user A to perform remote communication that produces a higher sense of presence. Likewise, the communication terminal 13B makes it possible to display, in the display apparatus 23B, an image having the same type of color as if the user A is also illuminated with the light from the lighting device 31B, thus allowing the user B to perform remote communication that produces a higher sense of presence. This allows the remote communication system 11 to provide a more satisfactory user experience.

In addition, in the remote communication system 11, for example, the communication processing section 24 is able to alter the color correction on the image that is to be displayed in the display apparatus 23, in response to a change in the color of the light at the self base or the other base.

For example, in an example illustrated in FIG. 2, to the communication terminal 13A, an image of the user B that has been captured under a lighting environment illuminated with light having a cold color is transmitted from the communication terminal 13B, and the light-source color of the lighting device 31A is changed from a warm color to a cold color. In this case, in response to the change in the light-source color of the lighting device 31A, the communication processing section 24A stops the color correction that the communication processing section 24A has performed to convert the image of the user B into a warm color, and causes the display apparatus 23A to display, without change, the image of the user B that has been captured in the lighting environment illuminated with the light having the cold color.

Likewise, in the communication terminal 13B, in response to the change in the light-source color of the lighting device 31A, the image of the user A that has been captured under the lighting environment illuminated with light having a warm color is changed to an image of the user A that has been captured under the lighting environment illuminated with light having a cold color. In this case, in response to the change in the light-source color of the lighting device 31A, the communication terminal 13B stops performing the color correction that the communication terminal 13B has performed to convert the image of the user A into a cold color, and causes the display apparatus 23B to display the image of the user A that has been captured under the lighting environment illuminated with the light having the cold color.

Thus, in the remote communication system 11, color correction is performed on the basis of an image analysis of the image at each of the self base and the other base. Therefore, in a case of a change in the light-source color, this makes it possible to alter the color correction in accordance with the light-source color after the change. Accordingly, for example, a system that performs color correction in accordance with a result of a prior estimation, a user specification, etc. fails to correspond to such a change in the light-source color, which leads to an assumption that the color tone of the image is likely to become unnatural and can spoil the sense of presence. In contrast, the remote communication system 11 enables performance of color correction in a unit of a frame as described later. Thus, performing color correction in response to the change in the light-source color makes it possible to prevent the color tone of the image from becoming unnatural, thus making it possible to provide a satisfactory user experience that produces a sense of presence.

Figure 3:
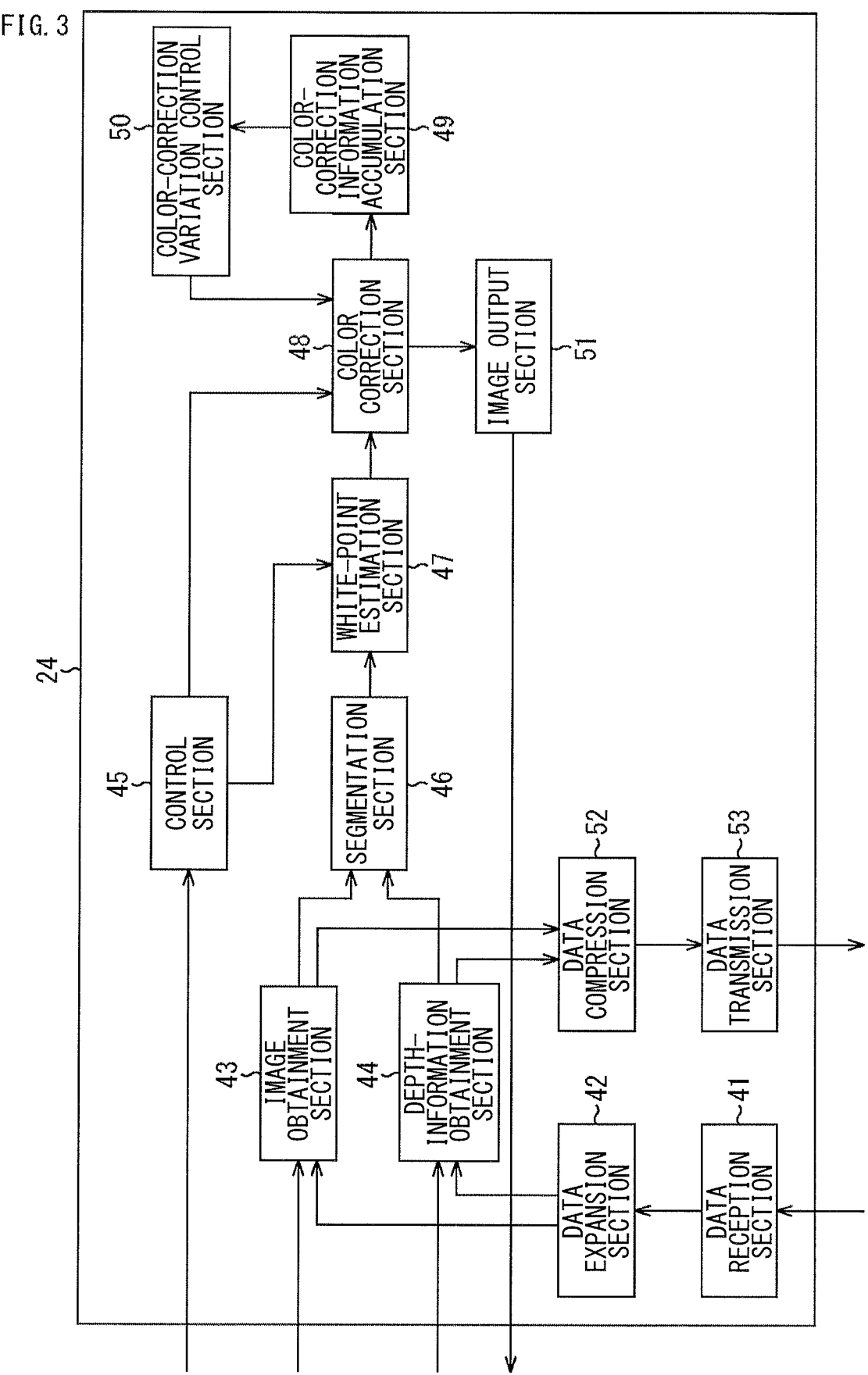
FIG. 3 is a block diagram that illustrates a first configuration example of a communication processing section.

FIG. 3 is a block diagram that illustrates a first configuration example of the communication processing section 24.

As illustrated in FIG. 3, the communication processing section 24 includes a data reception section 41, a data expansion section 42, an image obtainment section 43, a depth-information obtainment section 44, a control section 45, a segmentation section 46, a white-point estimation section 47, a color correction section 48, a color-correction information accumulation section 49, a color-correction variation control section 50, an image output section 51, a data compression section 52, and a data transmission section 53.

The data reception section 41 receives, via the network 12 in FIG. 1, data transmitted from the communication terminal 13 at the other base, and supplies the data to the data expansion section 42. For example, the data reception section 41 obtains the RGB image signal that is obtained from an image captured by, and then is outputted by the RGB sensor 21 at the other base, and the depth signal that is obtained from the imaging range of the image measured by, and then is outputted by the depth sensor 22 at the other base. It is to be noted that in a case where the communication terminal 13 at the other base does not include the depth sensor 22, the data reception section 41 receives only the RGB image signal, and the communication processing section 24 performs image processing without using any depth signal, thus separating a person and a background on the basis of the image.

For example, the data expansion section 42 performs data processing that expands, through decompression, the data that is compressed and transmitted in performance of communication via the network 12. Then, the data expansion section 42 supplies the image obtainment section 43 with the RGB image signal at the other base that is supplied from the data reception section 41, and supplies the depth-information obtainment section 44 with the depth signal at the other base that is supplied from the data reception section 41.

The image obtainment section 43, on the basis of the RGB image signal at the self base that is supplied from the RGB sensor 21 in FIG. 1, obtains an image captured at the self base, and supplies the image at the self base to the segmentation section 46, while supplying the RGB image signal at the self base to the data compression section 52. In addition, the image obtainment section 43 obtains an image on the basis of the RGB image signal at the other base that is supplied from the data expansion section 42, and supplies the image at the other base to the segmentation section 46.

The depth-information obtainment section 44, on the basis of a depth signal at the self base that is supplied from the depth sensor 22 in FIG. 1, obtains depth information in the imaging range at the self base, and supplies the depth information at the self base to the segmentation section 46, while supplying the depth signal at the self base to the data compression section 52. In addition, the image obtainment section 43 obtains depth information on the basis of the depth signal at the other base that is supplied from the data expansion section 42 and supplies the depth information at the other base to the segmentation section 46.

For example, the control section 45 is supplied with a control signal in response to an operation performed by a user on a control device that is not illustrated, and performs control of the white-point estimation section 47 and the color correction section 48 in accordance with the control signal.

For example, as described later, when the white-point estimation section 47 separates an image into a predetermined number of layers, a user is able to input layer-specifying information to the white-point estimation section 47 via the control section 45, thus making it possible to manually perform layer separation by the user. In addition, as described later, the color correction section 48 performs control of a correction amount, a correction method, etc., but the user is able to input a correction-amount input value to the white-point estimation section 47 via the control section 45, thus making it possible to manually set the correction amount, the correction method, etc. Furthermore, the user is able to adjust, via the control section 45, with respect to the white-point estimation section 47, each element used in calculating a weight in weight calculation processing in FIG. 18 that is described later.

The segmentation section 46 performs segmentation that segments the image at the self base into a plurality of segments (regions) on the basis of the image at the self base that is supplied from the image obtainment section 43 and the depth information at the self base that is supplied from the depth-information obtainment section 44. For example, for each of various objects such as a wall or a ceiling, on the basis of a characteristic thereof, the segmentation section 46 segments an image into regions that include respective objects. For example, the segmentation section 46 is able to perform segmentation using an existing method such as a Mean Shift method that classifies pixels belonging to the same region on the basis of similarity to a neighboring pixel in luminance, color, etc. on a per pixel basis.

Then, the segmentation section 46 supplies to the white-point estimation section 47, along with the image and depth information at the self base, region information that specifies a plurality of regions resulting from segmentation performed on the image at the self base. Likewise, the segmentation section 46 performs segmentation that segments the image at the other base into a plurality of regions, and supplies the white-point estimation section 47 with the image at the other base, the depth information at the other base, and the region information at the other base.

On the basis of the depth information and region information at the self base, the white-point estimation section 47 estimates the white point by performing an image analysis on the image as a whole at the self base and on each of the plurality of regions in the image at the self base, thus estimating the lighting environment in which the image at the self base has been captured. Likewise, on the basis of the depth information and region information at the other base, the white-point estimation section 47 estimates the white point by performing an image analysis on the image as a whole at the other base and on each of the plurality of regions in the image at the other base, thus estimating the lighting environment in which the image at the other base has been captured.

The color correction section 48 performs color correction processing that corrects a color of the image at the other base that has been captured with the light-source color corresponding to the lighting environment at the other base, in accordance with the light-source color corresponding to the lighting environment at the self base that is estimated by the white-point estimation section 47. For example, as has been described with reference to FIG. 1, in a case where the light-source color at the self base is a warm color and the image at the other base is captured in a cold light-source color, the color correction section 48 performs color correction processing on the image at the other base, using the color correction amount that causes a change from the cold color to a warm color. Then, the color correction section 48 supplies the image output section 51 with the image at the other base on which the color correction processing has been performed, while supplying the color-correction information accumulation section 49 with the color correction amount that is used in correcting the color of the image at the other base. In addition, for example, the color correction section 48 is able to perform such color correction processing on the image at the other base in the unit of a frame, to make it possible to respond to the change in the light-source color as has been described with reference to FIG. 2.

The color-correction information accumulation section 49 accumulates, as color correction information, in the unit of a frame of the image at the other base, the color correction amount used for each frame.

The color-correction variation control section 50, with reference to the color correction information accumulated in the color-correction information accumulation section 49, performs control of the color correction amount used by the color correction section 48 in performing color correction processing, to prevent a change that causes the color correction amount for correcting the color of the image to diffuse in a time direction.

The image output section 51 outputs an RGB image signal that is to cause the display apparatus 23 in FIG. 1 to display the image at the other base on which color correction processing has been performed by the color correction section 48.

The data compression section 52 performs data processing that compresses, to transmit via the network 12, the RGB image signal at the self base that is supplied from the image obtainment section 43 and the depth signal at the self base that is supplied from the depth-information obtainment section 44, and supplies the compressed data to the data transmission section 53.

The data transmission section 53 transmits to the communication terminal 13 at the other base via the network 12, the compressed RGB image signal and depth signal at the self base that are supplied from the data compression section 52.

The communication processing section 24 is configured as described above, and is able to perform an image analysis, using the image and depth information at the self base and the image and depth information at the other base, and perform color correction processing on the image at the other base in accordance with the light-source color at the self base.

Figure 4:
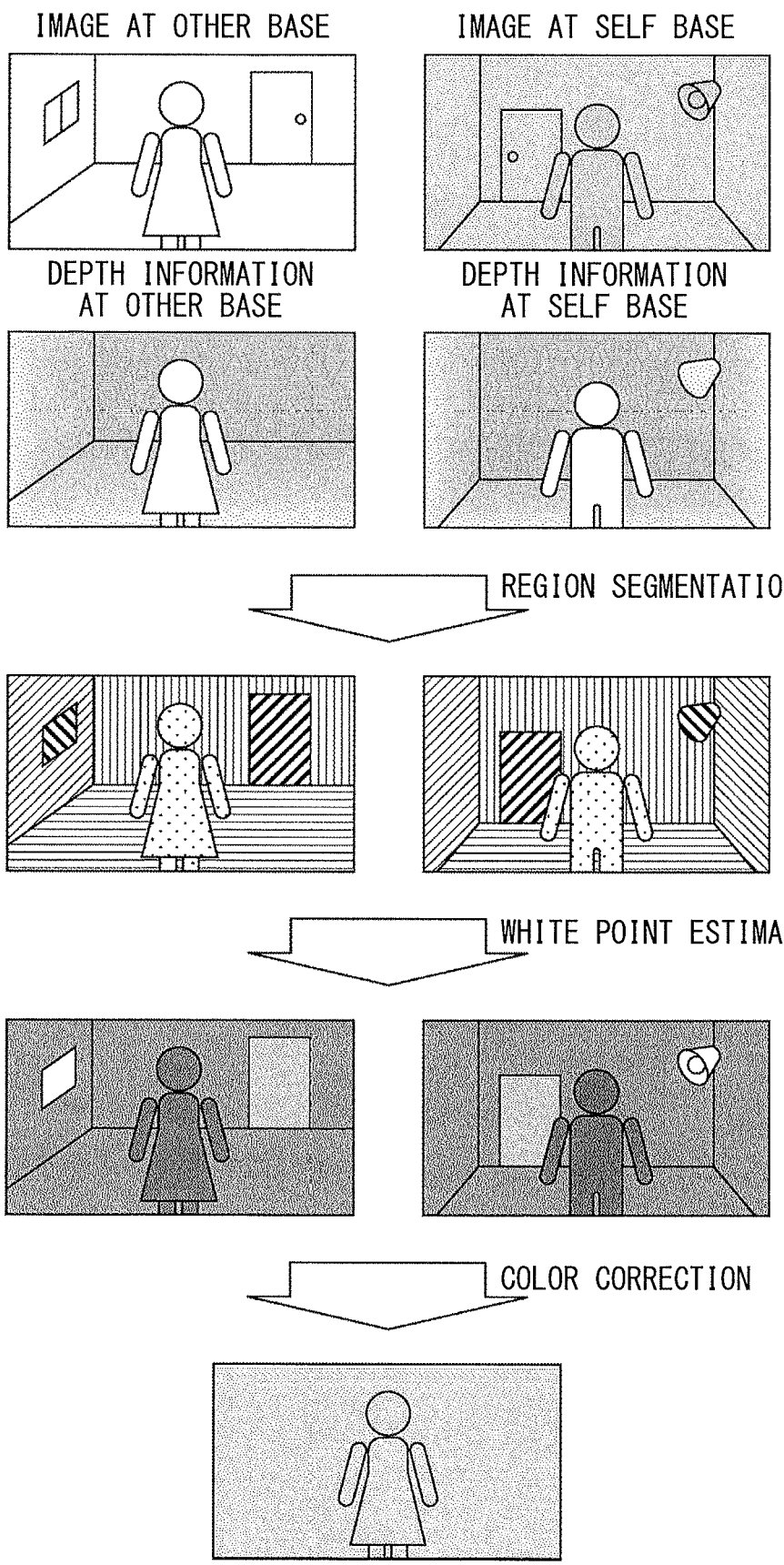
FIG. 4 is a diagram that describes an overview of processing in a communication processing section.

In other words, as illustrated in FIG. 4, in the communication processing section 24, the segmentation section 46 performs segmentation on the basis of the image and depth information at the self base and the image and depth information at the other base. As illustrated by different patterns of hatching in FIG. 4, this causes each of the image at the self base and the image at the other base to be segmented into a plurality of regions.

Furthermore, in the communication processing section 24, an image analysis is performed in the white-point estimation section 47, to thereby estimate the white point from the image at the self base while estimating the white point from the image at the other base, thus estimating the lighting environment at each of the self base and the other base. Then, in the communication processing section 24, color correction is performed on the image at the other base in accordance with the light-source color at the self base.

Performing such image processing allows the communication processing section 24 to display, in the display apparatus 23, the image at the other base on which color correction has been performed in accordance with the light-source color at the self base, that is, the image that looks as if the light at the self base is also illuminating the other base. This allows the user to perform remote communication using the image that produces a higher sense of presence.

In addition, for example, the communication processing section 24, using depth information, makes it possible to perform image processing on the image at the other base, to cause the light at the self base to illuminate a front side of the image of the other base while preventing the light at the self base from illuminating as far as a back side of the image at the other base.

Figure 5:
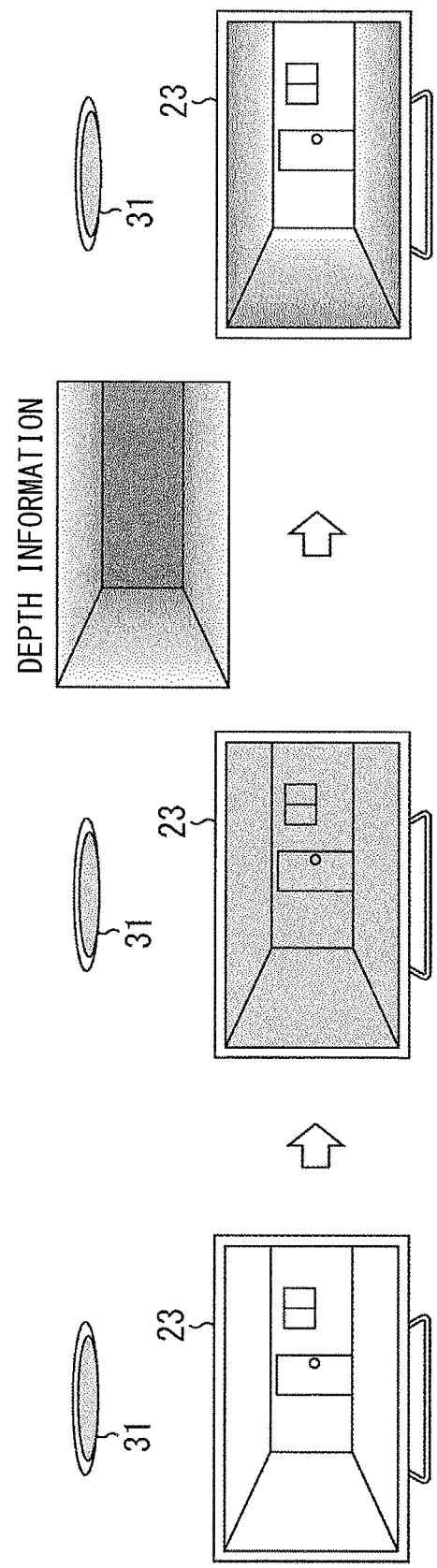
FIG. 5 is a diagram that describes color correction using depth information.

In other words, as illustrated in FIG. 5, in a case where the light-source color of the lighting device 31 at the self base is a warm color and the image at the other base is captured under the lighting environment having a cold color, first, uniformly correcting the color of the image at the other base makes it possible to display, in the display apparatus 23, the image at the other base on which color correction to a warm color has been performed. Furthermore, it is possible to adjust the color correction amount, using depth information by changing the color correction amount between the front side and the back side of the image at the other base, to a larger color correction amount for the front side and to a smaller color correction amount for the back side. This makes it possible to display, in the display apparatus 23, the image at the other base on which color correction has been performed to have a warm color on the front side while having a cold color toward the back.

Performing such image processing allows a user to have a heightened sense of connection as if a room of the user is seamlessly connected with a room of a side of a partner, thus making it possible to perform remote communication that produces a higher sense of presence.

Here, processing performed by the white-point estimation section 47 to estimate the white point is described.

For example, the white-point estimation section 47 calculates a weight value w (w=0.0 to 1.0) for each region classified by the segmentation section 46. Then, the white-point estimation section 47 estimates the white point in the image as a whole by multiplying each weight value w of a plurality of regions by an average value avg (c (R, G, B)) or a maximum value max (c (R, G, B)) of a color of a corresponding one of the regions.

For example, when the segmentation section 46 segments the image into a segmented-region number n of regions, a white point c $(R, G, B)_{WP}$ is estimated by the following expression (1) or expression (2), using a weight value $w_i$ of an i-th region and an average value avg (c $(R, G, B))_i$ or a maximum value max (c $(R, G, B))_i$ of a color of the i-th region.

[Expression 1]

$$c(R, G, B)_{WP} = \frac{\sum_{i=0}^{n} w_i avg(c(R, G, B))_i}{\sum_{i=0}^{n} w_i} \quad (1)$$

[Expression 2]

$$c(R, G, B)_{WP} = \frac{\sum_{i=0}^{n} w_i \max(c(R, G, B))_i}{\sum_{i=0}^{n} w_i} \quad (2)$$

For example, in a case where there is one light source in the environment in which the image has been captured, a value calculated by the expression (1) or expression (2) represents the estimated white point of the light-source color.

Furthermore, the white-point estimation section 47 separates the image into a predetermined number of layers (for example, three layers including a foreground layer, a midground layer, and a background layer) on the basis of the depth information supplied from the depth-information obtainment section 44, and estimates the white point for each layer in a manner similar to the manner as described above. In addition, the white-point estimation section 47 may separate the image into a predetermined number of layers on the basis of human masking information. For example, as illustrated in A of FIG. 6, depth information represents the depth in the imaging range in which the image is captured, and is expressed, for example, as a grayscale image corresponding to the depth of the image. In addition, as illustrated in B of FIG. 6, human masking information masks a person (object) included in the image, and, for example, is expressed as an image in which a region from which the person is detected is expressed in white and another region is expressed in black.

Then, in a case where a gap between the white point estimated for each layer and the white point estimated for the image as a whole is less than a reference value and the white points almost match each other, the white-point estimation section 47 determines that there is one light source in the image. Whereas, in a case where the gap between the white point estimated for each layer and the white point estimated for the image as a whole is larger than the reference value and the white points do not match each other, the white-point estimation section 47 determines that there is one light source corresponding to each layer.

Figure 7:
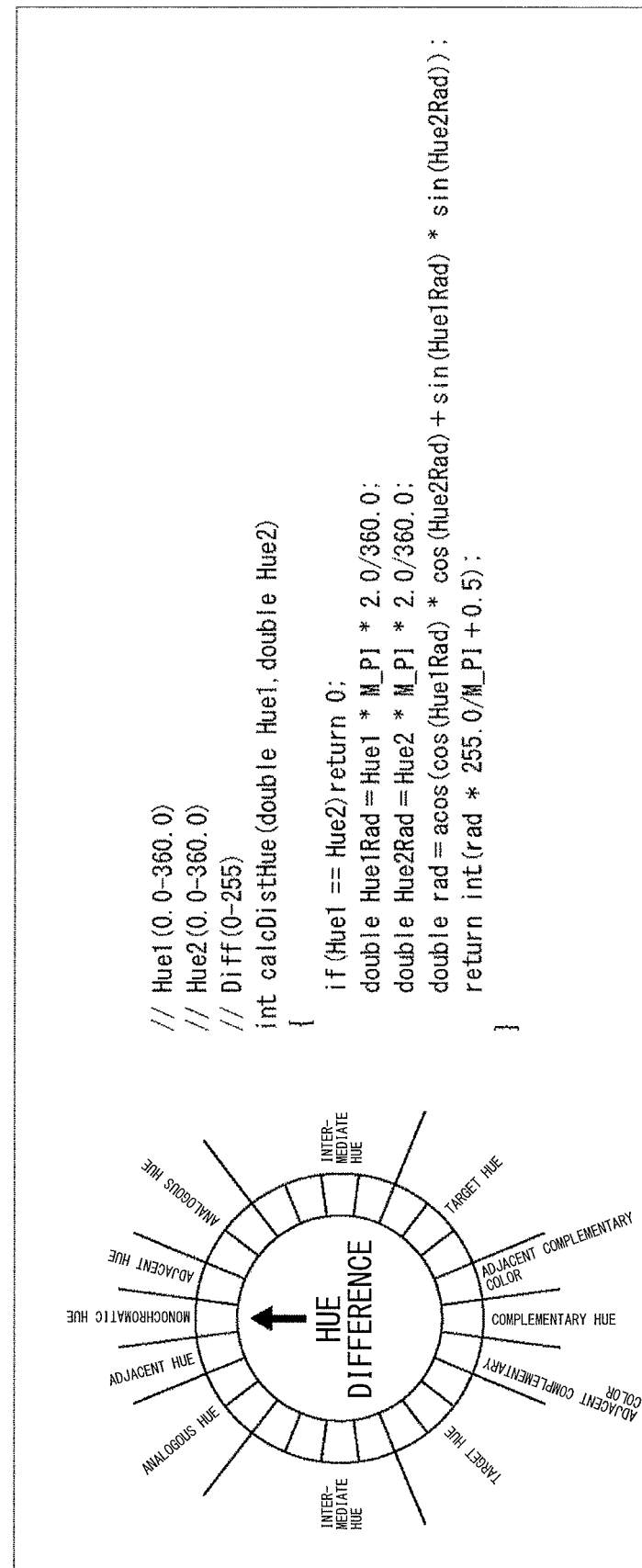
FIG. 7 is a diagram that illustrates an example of an algorithm that determines, using hue, a difference in light-source color.

Here, for example, it is possible to calculate a size of the gap between the white points by calculating a size of an angle formed by a unit vector of hue (Hue) as illustrated in FIG. 7, etc. FIG. 7 illustrates an example of an algorithm that determines, using hue, a difference in the light-source color.

In addition, as a method of separating the image into layers, other than separating the image into the front side and the back side using depth information, a method of separating the image into a right side and a left side or a method of separating the image into an upper side and a lower side may be used. Alternatively, these methods may be combined to separate the layers. It is to be noted that the number of layers is not limited, and a maximum number of layers is pixel resolution. For example, in a case where the image has a pixel size of 1920×1080, it is possible to separate the image into one layer at a minimum to 2073600 layers at a maximum.

Meanwhile, in a region estimated to include a large amount of information regarding the light-source color, it is necessary to set a larger weight value. In addition, it is assumed that remote communication is performed in a room. Therefore, on the basis of an assumption as illustrated in FIG. 8, regarding a region in which a white material (in other words, a material that reflects the light-source color directly) is used, such as a wall or a ceiling in the room, a light-source color usually used in the room (2700K to 6500K), etc., it is effective to calculate a size of the weight value used in estimating the white point.

In other words, as illustrated in FIG. 8, on the basis of an assumption that the wall or ceiling has a smaller high-frequency component, a weight value that assigns a larger weight is used for a region having a smaller high-frequency component. In addition, on the basis of an assumption that a wall or a ceiling has a large region size, a weight value that assigns a larger weight is used for a region having a larger region size. In addition, on the basis of an assumption that the light source usually used in a room is often 2700K to 6500K, a weight value that assigns a larger value is used for a region having a color closer to the white point of a white LED (Light Emitting Diode) having a chromaticity of 2700K to 6500K. In addition, on the basis of an assumption that an object having a color close to white reflects the light-source color more easily, a weight value that assigns a larger weight to a region having a color close to the white point of D65 is used.

As described above, the white-point estimation section 47 is able to perform processing that estimates the white point.

Next, the color correction processing performed by the color correction section 48 is described.

For example, the color correction section 48 is able to correct the color with respect to the image at the other base in accordance with the lighting environment at each of the self base and the other base, for example, in accordance with the number of light sources, a difference in the light-source color, a position of the light source, depth information, and so on. An example of such color correction by the color correction section 48 is described with reference to FIGS. 9 to 14. It is to be noted that in FIGS. 9 to 14, the communication terminal 13A is described as the self base, and the communication terminal 13B is described as the other base.

Figure 9:
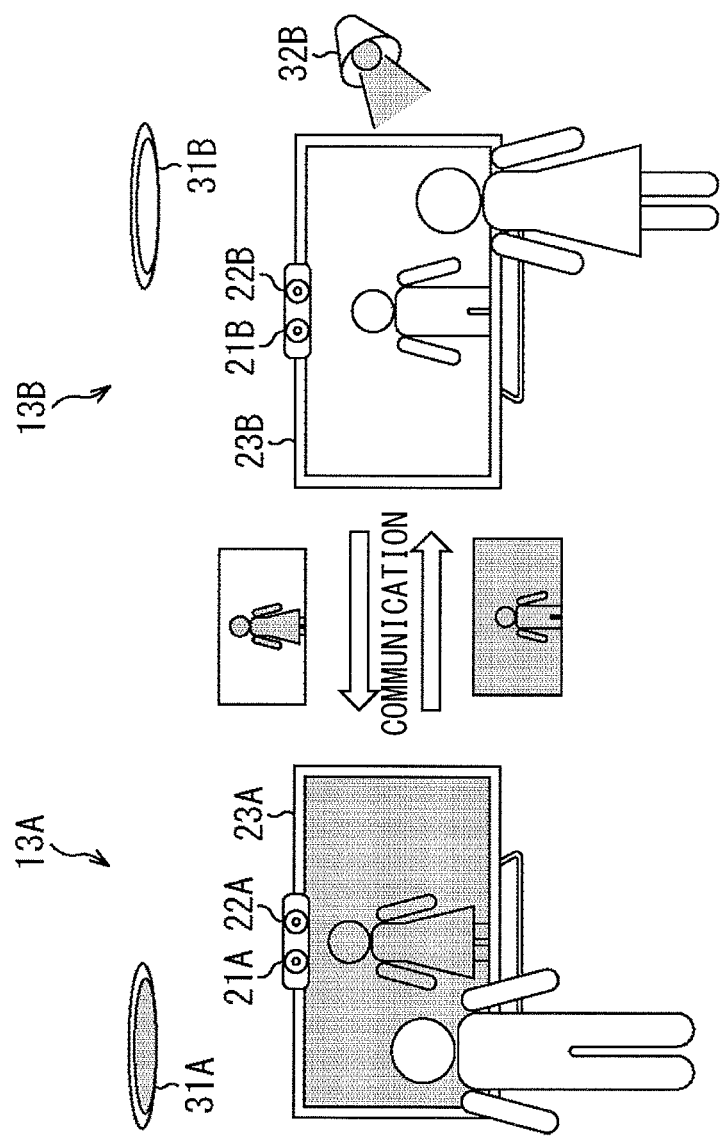
FIG. 9 is a diagram that describes an example of color correction when two light sources each having a different light-source color are provided at another base.

For example, as illustrated in FIG. 9, the lighting environment at the self base includes only the lighting device 31A having a warm light-source color, and the lighting environment at the other base includes the lighting device 31B having a cold light-source color and illuminating a whole room, and the user B is illuminated by the lighting device 32B having a warm light-source color. In this case, to the communication terminal 13A, an image captured under the lighting environment in which the user B is illuminated with light having a warm color in a background having a cold color is transmitted from the communication terminal 13B.

The color correction section 48A is able to perform color correction on such an image for each layer, to cause the image to have a warm color in accordance with the light-source color of the lighting device 31A. For example, the color correction section 48A does not correct the color with respect to a layer (user B) in the foreground having a warm light-source color, and corrects the color with respect to a layer in the background having a cold light-source color to a warm color.

This allows the communication terminal 13A to display, in the display apparatus 23A, an image of the user B in which the color of the foreground and the background has been corrected to a warm color. Accordingly, this allows the user A to perform remote communication that produces a sense of presence, using an image that looks as if the lighting device 31A having a warm light-source color is illuminating as far as an inside of the image displayed in the display apparatus 23A.

Figure 10:
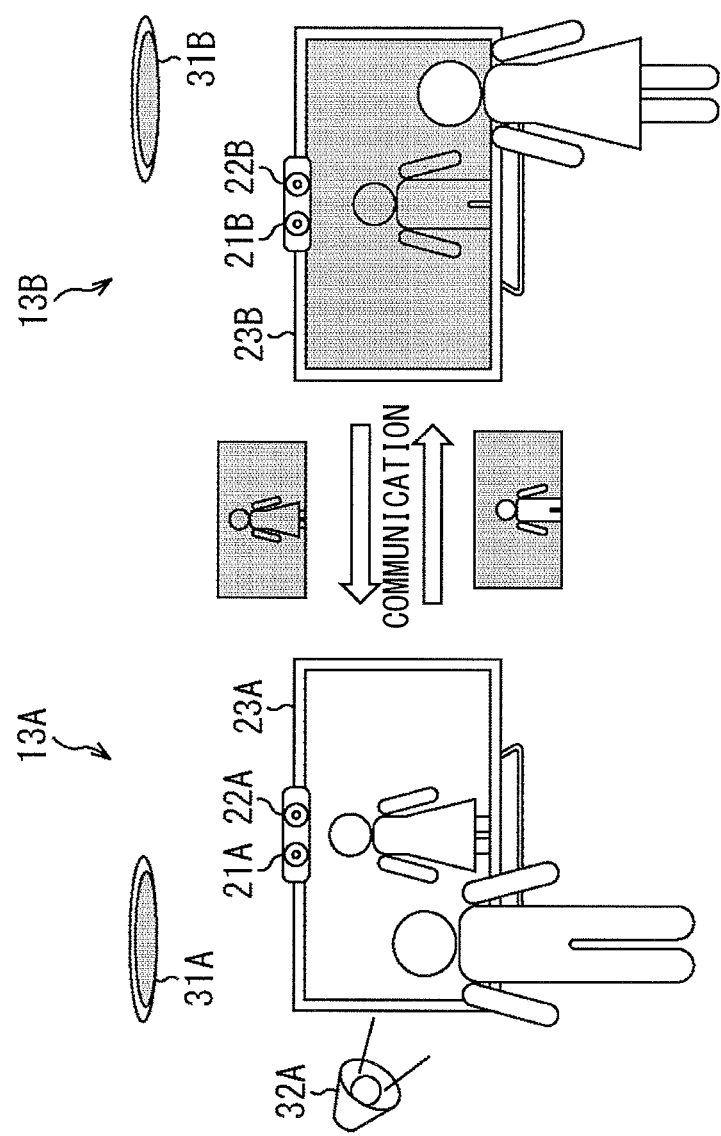
FIG. 10 is a diagram that describes an example of color correction when two light sources each having a different light-source color are provided at a self base.

In addition, as illustrated in FIG. 10, it is assumed that in the lighting environment at the self base, the lighting device 31A having a warm light-source color is used on the back side, and that the lighting device 32A having a cold light-source color is used on the front side, while in the lighting environment at the other base, only the lighting device 32B having a warm light-source color is used. In this case, to the communication terminal 13A, an image captured under the lighting environment that looks as if the background and the user B are illuminated with light having a warm color is transmitted from the communication terminal 13B.

The color correction section 48A is able to uniformly perform color correction on such an image, to cause the image to have a cold color in accordance with the light-source color of the lighting device 32A on the front side. In other words, the color correction section 48A corrects the color of the image having a warm light-source color as a whole to a cold color.

This allows the communication terminal 13A to display, in the display apparatus 23A, the image of the user B with which the color of the whole image has been corrected to a cold color. Accordingly, this allows the user A to perform remote communication that produces a sense of presence, using an image that looks as if the lighting device 32A having a cold light-source color on the front side is illuminating as far as the inside of the image displayed in the display apparatus 23A.

Figure 11:
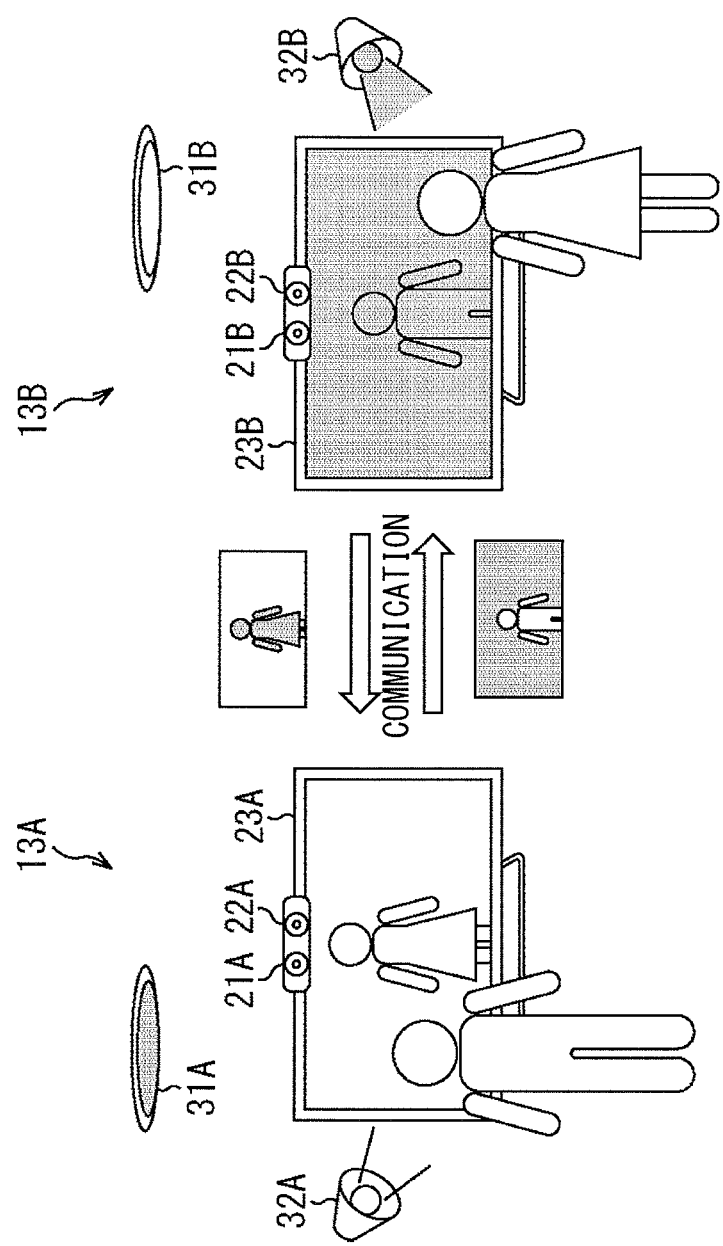
FIG. 11 is a diagram that describes an example of color correction when two light sources each having a different light-source color are provided at each of a self base and another base.

In addition, as illustrated in FIG. 11, it is assumed that in the lighting environment at the self base, the lighting device 31A having a warm light-source color is used on the back side, and the lighting device 32A having a cold light-source color is used on the front side. In addition, it is assumed that in the lighting environment at the other base, the lighting device 31B having a cold light-source color is used on the back side, and the lighting device 32B having a warm light-source color is used on the front side. In this case, to the communication terminal 13A, an image captured under the lighting environment that looks as if the user B is illuminated with light having a warm color in the background having a cold color is transmitted from the communication terminal 13B.

The color correction section 48A is able to perform, for each layer, color correction on such an image to cause the image to have a cold color in accordance with the light-source color of the lighting device 32A on the front side. For example, the color correction section 48A corrects the color of a layer in the foreground (user B) having a warm light-source color to a cold color, and does not correct the color with respect to a layer in the background having a cold light-source color.

This allows the communication terminal 13A to display, in the display apparatus 23A, the image of the user B in which the color of the foreground and the background has been corrected to a cold color. Accordingly, this allows the user A to perform remote communication that produces a sense of presence, using an image that looks as if the lighting device 32A having a cold light-source color on the front side is illuminating as far as the inside of the image displayed in the display apparatus 23A.

Figure 12:
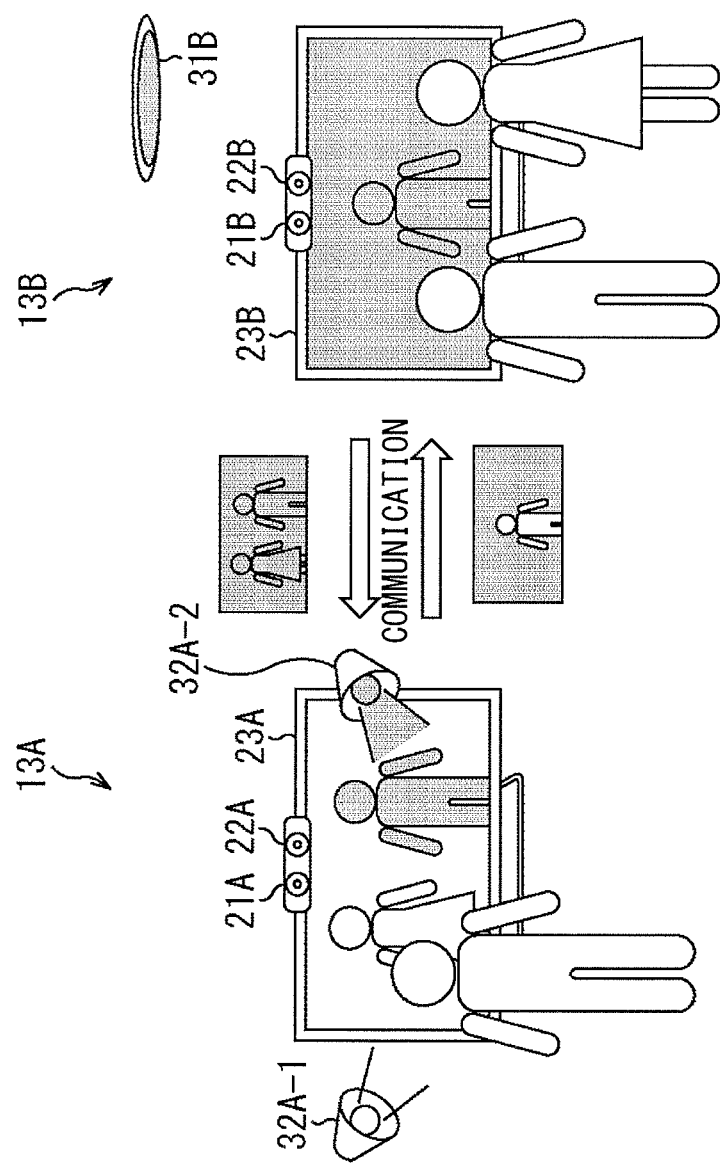
FIG. 12 is a diagram that describes an example of color correction when two light sources each having a different light-source color are disposed right and left at a self base.

In addition, as illustrated in FIG. 12, it is assumed that in the lighting environment at the self base, a lighting device 32A-1 having a cold light-source color is used on the left side, and a lighting device 32A-2 having a warm light-source color is used on the right side. In addition, it is assumed that in the lighting environment at the other base, the lighting device 31B having a warm light-source color is illuminating two users standing side by side. In this case, to the communication terminal 13A, an image captured under the lighting environment that looks as if the two users are illuminated with light having a warm color is transmitted from the communication terminal 13B.

The color correction section 48A performs color correction on such an image in accordance with the position of each of the lighting device 32A-1 and the lighting device 32A-2, to cause the image to have a cold color on the left side in accordance with the light-source color of the lighting device 32A-1 while causing the image to have a warm color on the right side in accordance with the light-source color of the lighting device 32A-2. For example, the color correction section 48A corrects the color with respect to the user included on the left side to a cold color and corrects the color with respect to the user included on the right side to a warm color.

This allows the communication terminal 13A to display, in the display apparatus 23A, the image that is corrected to have a cold color in accordance with the position of the lighting device 32A-1 and corrected to have a warm color in accordance with the position of the lighting device 32A-2. Accordingly, this allows the user A to perform remote communication that produces a sense of presence, using an image that looks as if each of the lighting device 32A-1 and the lighting device 32A-2 is illuminating as far as the inside of the image displayed in the display apparatus 23A.

Figure 13:
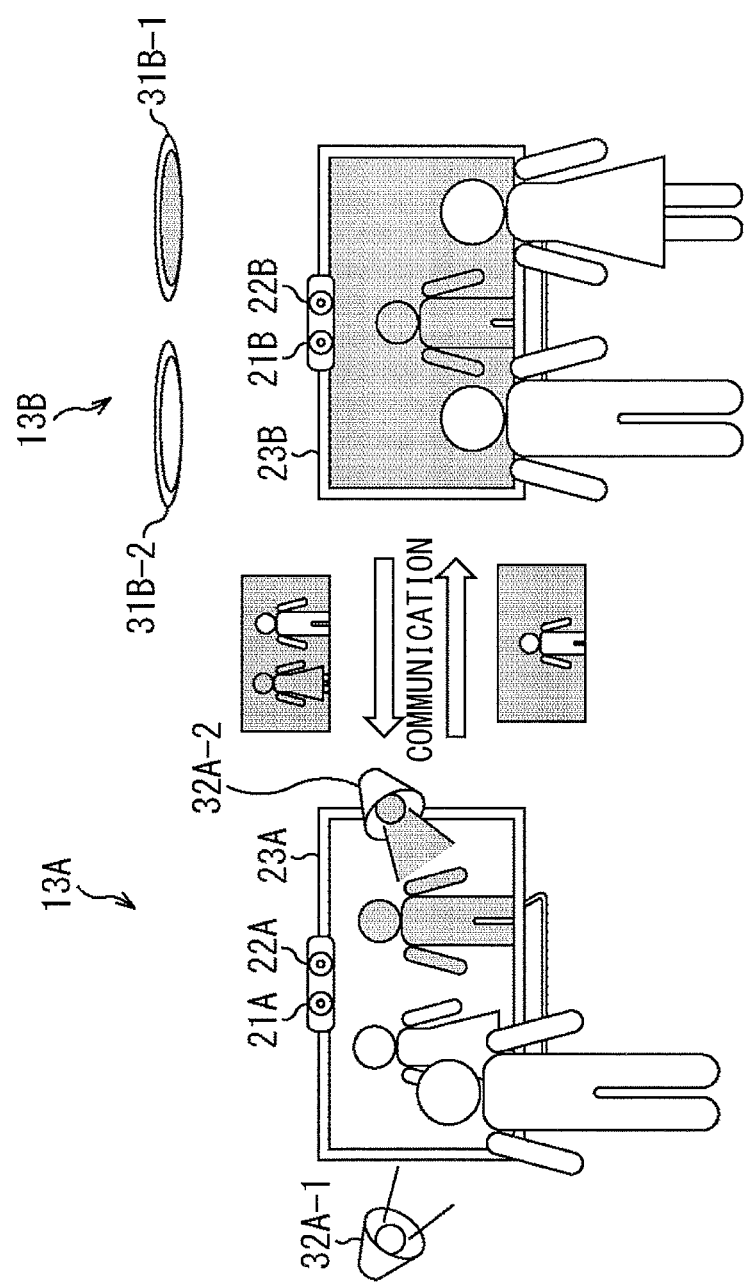
FIG. 13 is a diagram that describes an example of color correction when two light sources each having a different light-source color are disposed right and left at each of a self base and another base.

In addition, as illustrated in FIG. 13, it is assumed that in the lighting environment at the self base, the lighting device 32A-1 having a cold light-source color is used on the left side, and the lighting device 32A-2 having a warm light-source color is used on the right side. In addition, it is assumed that in the lighting environment at the other base, the lighting device 31B-1 having a warm light-source color is used on the right side, and the lighting device 31B-2 having a cold light-source color is used on the left side, each of which is illuminating two users standing side by side. In this case, to the communication terminal 13A, an image of the two users captured under the lighting environment that looks as if the user on the right side is illuminated with light having a warm color and the user on the left side is illuminated with light having a cold color is transmitted from the communication terminal 13B.

The color correction section 48A is able to perform color correction on such an image in accordance with the position of each of the lighting device 32A-1 and the lighting device 32A-2, to cause the image to have a cold color on the left side in accordance with the light-source color of the lighting device 32A-1 while causing the image to have a warm color on the right side in accordance with the light-source color of the lighting device 32A-2. For example, the color correction section 48A is able to correct the color with respect to the user included on the left side to a cold color and correct the color with respect to the user included on the right side to a warm color.

This allows the communication terminal 13A to display, in the display apparatus 23A, the image that is corrected to have a cold color in accordance with the position of the lighting device 32A-1 and corrected to have a warm color in accordance with the position of the lighting device 32A-2. Accordingly, this allows the user A to perform remote communication that produces a sense of presence, using an image that looks as if each of the lighting device 32A-1 and the lighting device 32A-2 is illuminating as far as the inside of the image displayed in the display apparatus 23A.

Figure 14:
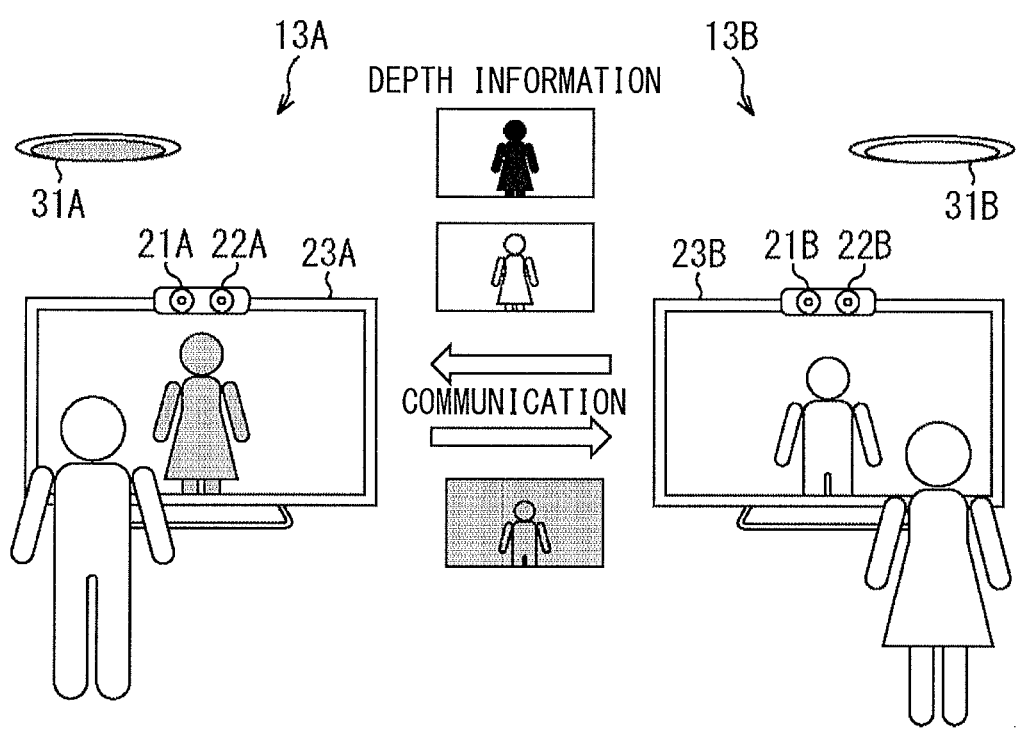
FIG. 14 is a diagram that describes an example of color correction performed for each layer, using depth information.

In addition, as illustrated in FIG. 14, it is assumed that in the light environment at the self base, only the lighting device 31A having a warm light-source color is used, and in the lighting environment at the other base, only the lighting device 31B having a cold light-source color is used. In this case, to the communication terminal 13A, an image captured under the lighting environment that looks as if light having a cold color is illuminating the background and the user B is transmitted along with depth information from the communication terminal 13B.

The color correction section 48A is able to perform color correction on such an image in accordance with the depth on the basis of the depth information, to cause the image to have a warm color only on the front side in accordance with the light-source color of the lighting device 31A. In other words, the color correction section 48A corrects the color with respect to the user B located on the front side to a warm color, and does not correct the color with respect to the background on the back side.

This allows the communication terminal 13A to display, in the display apparatus 23A, the image corrected to a warm color only on the front side on the basis of the depth information. Accordingly, this allows the user A to perform remote communication that produces a sense of presence, using an image that looks as if the lighting device 31A is illuminating the user B on the front side in the image displayed in the display apparatus 23A.

At this time, for example, the color correction section 48A makes it possible to perform color correction that reduces an influence of the lighting device 31A from the front side toward the back side, that is, to perform adjustment to set a smaller color correction amount for use in the color correction.

For example, the color correction section 48A is able to perform color correction through adjustment, for example, reducing the correction amount in accordance with a distance from the foreground, other than separating between the foreground and the background on the basis of the depth information and performing color correction only on the foreground.

In other words, the color correction section 48A completely replaces, with the light-source color of the lighting device 31A, a region having depth information indicating 0 as a state of being most influenced by the lighting device 31A. Then, the color correction section 48A is able to perform adjustment to reduce the correction amount in accordance with a light attenuation rate, to an inverse square of a distance from the light source. For example, it is possible to perform such an adjustment of the correction amount in accordance with the following expression (3), using a correction-amount ratio α and a depth d. It is to be noted that in the expression (3), it is also possible to adjust the correction amount using a variable β in accordance with an input by a user.

[Expression 3]

$$\alpha = 1 \times \frac{1}{(1+\beta d)^2} \quad (3)$$

In addition, for actual color correction processing, other than a method of simply performing color correction in an RGB color space, a method of calculating a transformation matrix of the white point in an LMS color space that is close to a human perception may be used. For example, an expression (4) represents a transformation formula by which color conversion is performed in the LMS color space using an RGB value of an image at the other base as an input, to perform correction to the light-source color at the self base, and then provide an output as the RGB color space. It is to be noted that for a matrix $M_A$ used in the expression (4), it is possible to use a Bradford transformation matrix, a Von Kries transformation matrix, and the like.

[Expression 4]

$$\begin{pmatrix} R_D \\ G_D \\ B_D \end{pmatrix} = \quad (4)$$

$$(XYZ2SRGB)M_A^{-1}\begin{pmatrix} \frac{L_D}{L_S} & 0 & 0 \\ 0 & \frac{M_D}{M_S} & 0 \\ 0 & 0 & \frac{S_D}{S_S} \end{pmatrix} M_A(SRGB2XYZ)\begin{pmatrix} R_S \\ G_S \\ B_S \end{pmatrix}$$

$$\begin{pmatrix} L_D \\ M_D \\ S_D \end{pmatrix} = M_A \begin{pmatrix} X_D \\ Y_D \\ Z_D \end{pmatrix}$$

$$\begin{pmatrix} L_S \\ M_S \\ S_S \end{pmatrix} = M_A \begin{pmatrix} X_S \\ Y_S \\ Z_S \end{pmatrix}$$

In addition, as a method of adjusting the correction amount that is to be used by the color correction section 48A, a method of simply alpha-blending, using the correction-amount ratio α in an xy-chromaticity diagram, in accordance with the following expression (5), xy coordinates (xS, yS) of a source white point subjected to correction and xy coordinates (xD, yD) of a target white point that is targeted for correction may be adopted.

[Expression 5]

$$\begin{pmatrix} x_D \\ y_D \end{pmatrix} = \alpha \begin{pmatrix} x_D \\ y_D \end{pmatrix} + (1.0 - \alpha)\begin{pmatrix} x_S \\ y_S \end{pmatrix} \quad (5)$$

Figure 15:
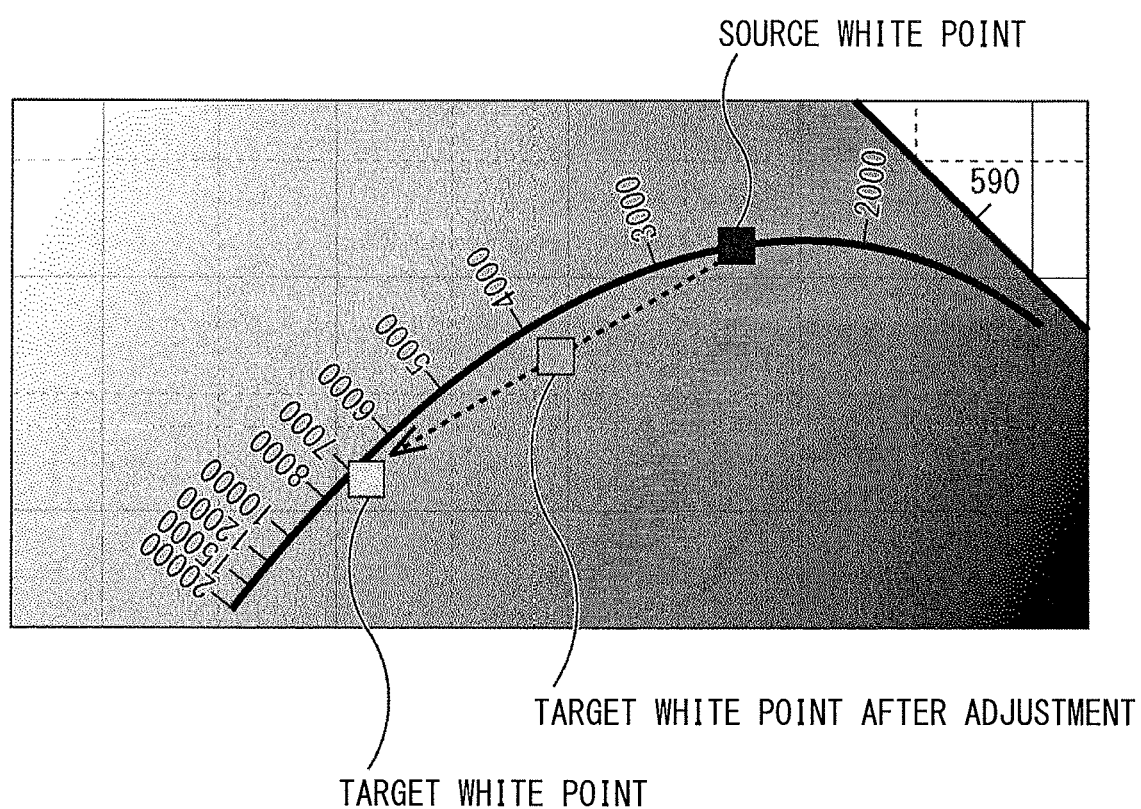
FIG. 15 is a diagram that describes a method of controlling a color correction amount using alpha blending.

Thus, for example, as illustrated in FIG. 15, used as the white point after correction is the white point (target white point after adjustment) that is calculated by alpha-blending the source white point subjected to correction and the target white point targeted for correction is used as the white point after correction.

Such a control of the correction amount (for example, setting of the ratio α, or the like) or a control of the correction method (whether or not to reduce the influence of the light source at the self base from the front side toward the back side of the image at the other base on the basis of depth information) may be manually set by the user via the control section 45.

<Example of Remote Communication Processing>

Figure 16:
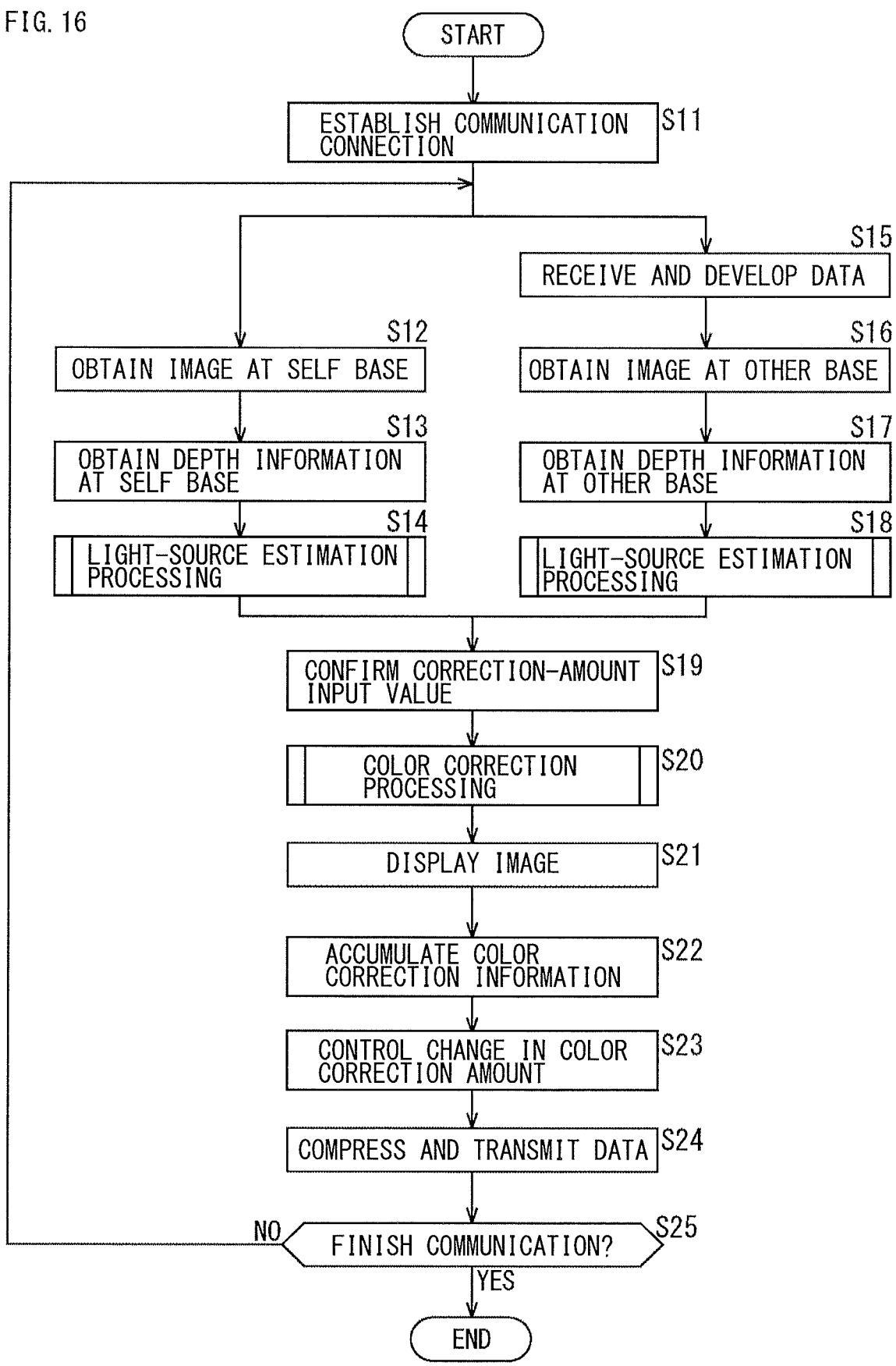
FIG. 16 is a flowchart that describes remote communication processing.

FIG. 16 is a flowchart that describes remote communication processing performed in the communication terminal 13.

In Step S11, when the communication terminal 13 is powered on to activate an application that performs remote communication, processing is started, to perform, in the communication terminal 13, processing to establish a connection with the communication terminal 13 at the other base. This causes the data reception section 41 and the data transmission section 53 to receive and transmit the data with the communication terminal 13 at the other base via the network 12.

In Step S12, the image obtainment section 43 obtains an image captured at the self base, on the basis of the RGB image signal at the self base that is supplied from the RGB sensor 21. Then, the image obtainment section 43 supplies the image at the self base to the segmentation section 46, and supplies the RGB image signal at the self base to the data compression section 52.

In Step S13, the depth-information obtainment section 44 obtains depth information in the imaging range at the self base on the basis of the depth signal at the self base that is supplied from the depth sensor 22. Then, the depth-information obtainment section 44 supplies the depth information at the self base to the segmentation section 46, and supplies the depth signal at the self base to the data compression section 52.

In Step S14, the segmentation section 46 and the white-point estimation section 47 each perform an image analysis on the image at the self base that is obtained by the image obtainment section 43 in Step S12, thus performing light-source estimation processing that estimates the light source at the self base (in FIG. 17 described later).

In addition, in parallel with the processing in Steps S12 to S14, processing in Steps S15 to S18 is performed.

In Step S15, the data reception section 41 receives the data transmitted from the communication terminal 13 at the other base, and supplies the data to the data expansion section 42. The data expansion section 42 expands the data and supplies the RGB image signal at the other base to the image obtainment section 43 while supplying the depth signal at the other base to the depth-information obtainment section 44.

In Step S16, the image obtainment section 43 obtains an image captured at the other base, on the basis of the RGB image signal at the other base that is supplied from the data expansion section 42 in Step S15, and supplies the image at the other base to the segmentation section 46.

In Step S17, the depth-information obtainment section 44 obtains depth information in the imaging range at the other base on the basis of the depth signal at the other base that is supplied from the data expansion section 42 in Step S15, and supplies the depth information at the other base to the segmentation section 46.

In Step S18, the segmentation section 46 and the white-point estimation section 47 each perform an image analysis on the image at the other base that is obtained by the image obtainment section 43 in Step S16, thus performing light-source estimation processing that estimates the light source at the other base (in FIG. 17 described later).

After processing in Steps S14 and S18, the processing proceeds to Step S19, and the color correction section 48 confirms the correction-amount input value that is inputted by the user via the control section 45.

In Step S20, the color correction section 48 performs color correction processing that corrects the color of the image at the other base in accordance with the light-source color at the self base (in FIG. 20 described later).

In Step S21, the image output section 51 outputs an RGB image signal to cause the display apparatus 23 to display the image at the other base on which color correction processing has been performed in Step S20. This causes the display apparatus 23 to display the image at the other base with the color corrected in accordance with the light-source color at the self base.

In Step S22, the color correction section 48 supplies the color-correction information accumulation section 49 with the color correction amount used in the color correction processing in Step S20, and the color-correction information accumulation section 49 accumulates, in the unit of a frame, the color correction amount as color correction information.

In Step S23, the color-correction variation control section 50 controls the color correction amount used in the color correction processing performed on a subsequent frame (subsequent Step S20), on the basis of the color correction information accumulated in the color-correction information accumulation section 49. For example, the color-correction variation control section 50 controls the color correction amount to prevent a change that cause the color of the image to diffuse in the time direction.

In Step S24, the data compression section 52 performs data processing that compresses the RGB image signal at the self base that is supplied from the image obtainment section 43 in Step S12 and the depth signal at the self base that is supplied from the depth-information obtainment section 44 in Step S13, and supplies the compressed data to the data transmission section 53. Then, the data transmission section 53 transmits the data compressed by the data compression section 52 to the communication terminal 13 at the other base via the network 12.

In Step S25, the communication terminal 13 determines whether or not to finish communication, and, for example, the foregoing processing is repeatedly performed per frame until it is determined to finish the communication. For example, when an operation is done to finish the application that performs remote communication, it is determined to finish communication in Step S25, and after processing to disconnect the connection with the communication terminal 13 at the other base is performed, the remote communication processing is finished.

As described above, in the communication terminal 13, for example, the light-source estimation processing, the color correction processing, or the like is performed per frame. Thus, even in a case of a change in the light-source color or a change in the number of the light sources, it is possible to correct the color with respect to the image at the other base in response to these changes.

Figure 17:
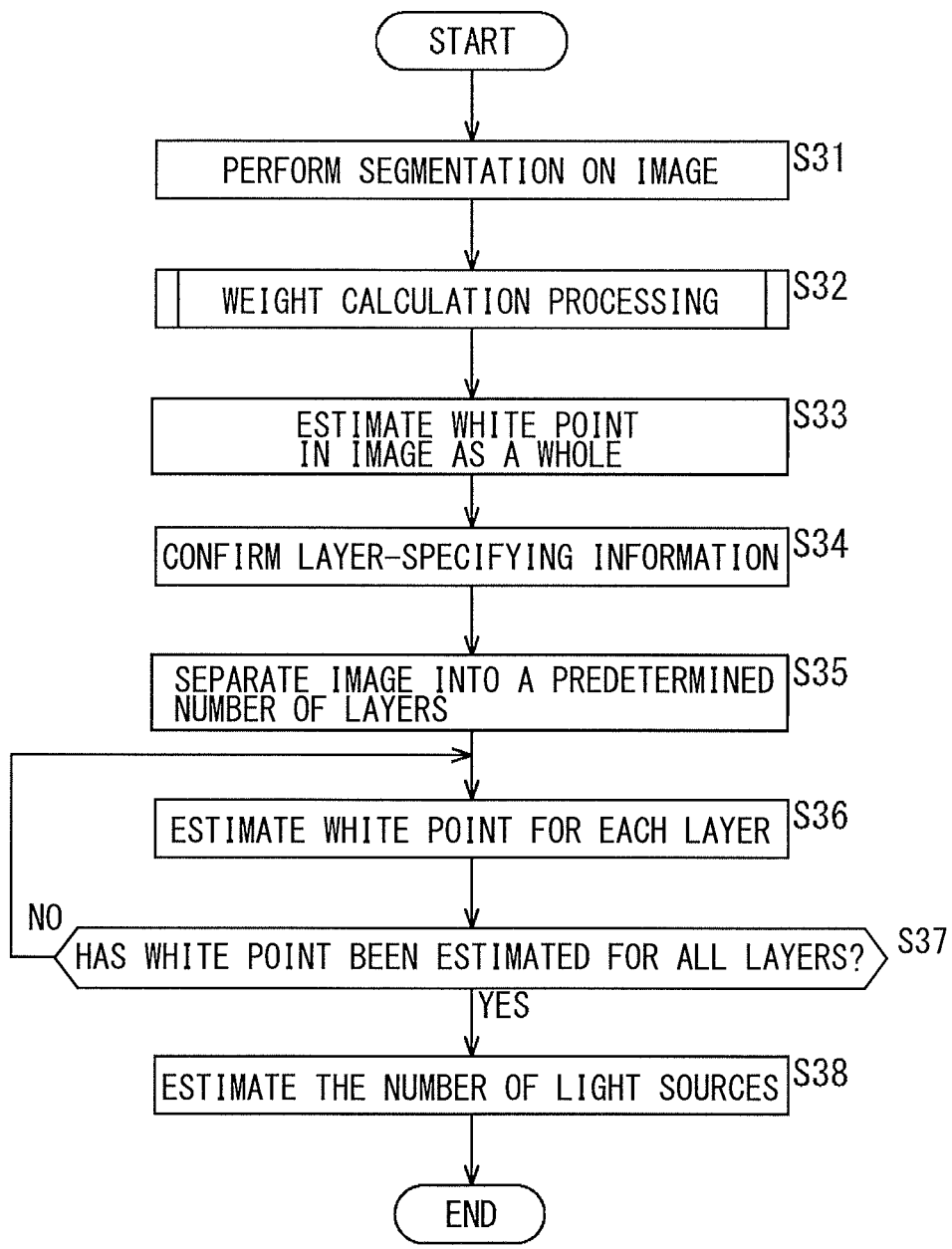
FIG. 17 is a flowchart that describes light-source estimation processing.

FIG. 17 is a flowchart that describes the light-source estimation processing performed in Steps S14 and S18 in FIG. 16. It is to be noted that processing in Step S14 is performed on the image at the self base as a processing subject, and processing in Step S18 is performed on the image at the other base as the processing subject, but each processing is different only in the processing subject but has the same processing content.

In Step S31, the segmentation section 46 performs image segmentation of an image on the basis of the image supplied from the image obtainment section 43 (Step S12 or S16) and the depth information supplied from the depth-information obtainment section 44 (Step S13 or S17). Then, the segmentation section 46, by performing image segmentation, obtains region information that specifies a plurality of regions obtained by performing segmentation on the image, and supplies the region information to the white-point estimation section 47 along with the image and the depth information.

In Step S32, the white-point estimation section 47 performs weight calculation processing (in FIG. 18 described later) that calculates the weight value for each of the plurality of segmented regions in the image.

In Step S33, the white-point estimation section 47 estimates the white point in the image as a whole by multiplying the weight value for each region that is calculated in Step S32 by an average value or maximum value of the color of a corresponding one of the regions (the foregoing expression (1) or (expression 2)).

In Step S34, the white-point estimation section 47 confirms layer-specifying information inputted by the user via the control section 45.

In Step S35, the white-point estimation section 47 separates the image into a predetermined number of layers in accordance with the layer-specifying information confirmed in Step S34, and sets the first layer as the processing subject.

In Step S36, the white-point estimation section 47 estimates the white point for each layer by multiplying a weight value for each region included in the layer subjected to processing by an average value or maximum value of the color of a corresponding one of the regions (the foregoing expression (1) or (expression 2)).

In Step S37, the white-point estimation section 47 determines whether or not the white points of all the layers have been estimated. In Step S37, in a case where it is determined that the white points of all the layers have not been estimated, the processing returns to Step S36 assuming that a layer having a white point not yet estimated is the processing subject, to estimate the white point for each layer. Then, in Step S37, in a case where it is determined that the white points of all the layers have been determined, the processing proceeds to Step S38.

In Step S38, the white-point estimation section 47 estimates the number of light sources in the environment in which the image has been captured. For example, in a case where there is a small gap between the white point in the image as a whole that is estimated in Step S33 and the white point estimated for each layer in Step S36, the white-point estimation section 47 estimates that there is one light source. Whereas, in a case where there is a large gap between the white point in the image as a whole that is estimated in Step S33 and the white point estimated for each layer in Step S36, the white-point estimation section 47 estimates that there is a plurality of light sources for each layer having a large gap. At this time, the white-point estimation section 47 is also able to estimate the light-source color and the position thereof (such as foreground layer or the background layer).

Then, the white-point estimation section 47 notifies the color correction section 48 of the result of the estimation in the light-source estimation processing, to finish processing in Step S38, and the light-source estimation processing is finished.

As described above, the white-point estimation section 47 estimates the white point for each layer, thus making it possible to estimate these light sources and reflect the estimation in the color correction processing, in a case where there is a plurality of light sources.

Figure 18:
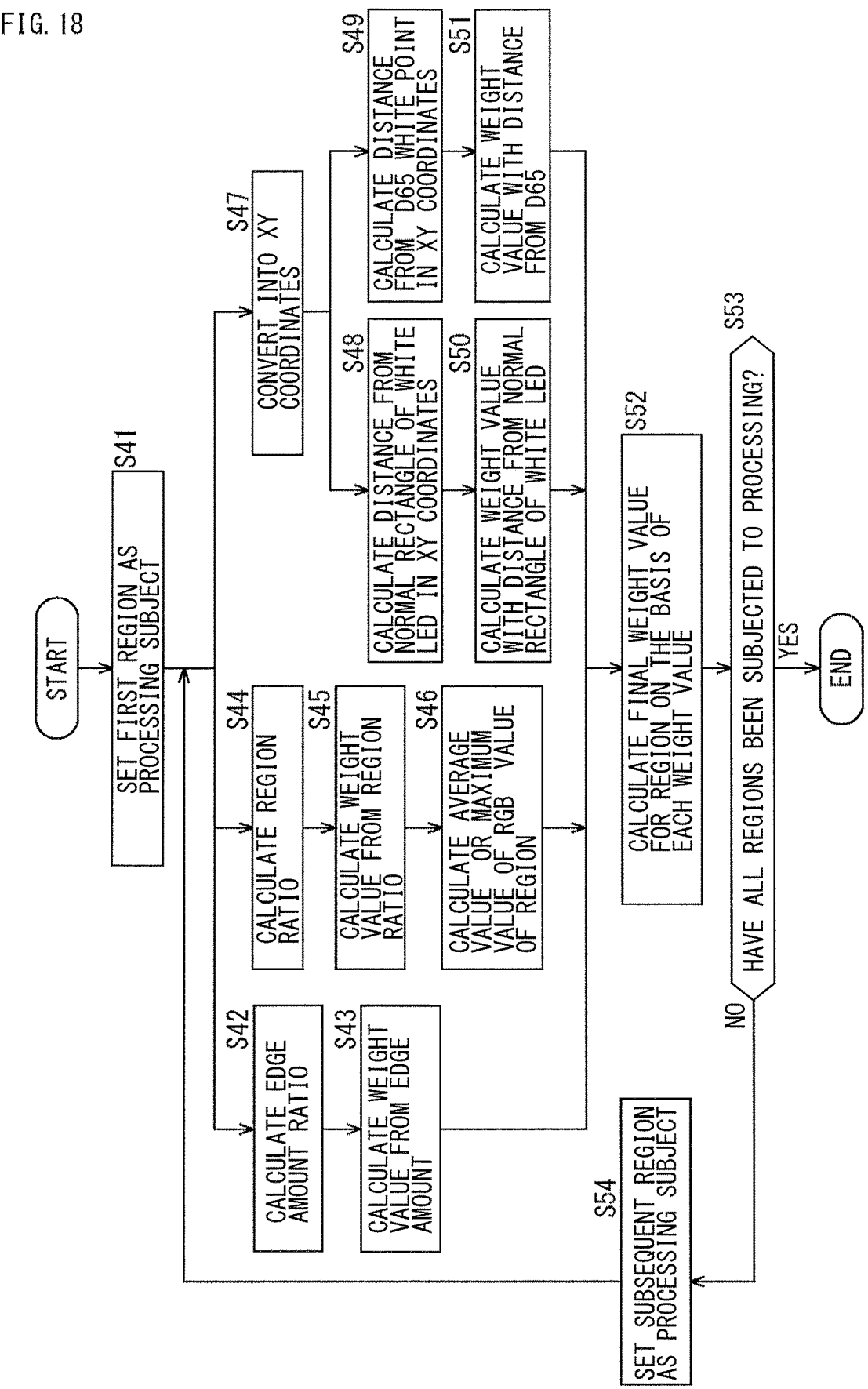
FIG. 18 is a flowchart that describes weight calculation processing.

Next, FIG. 18 is a flowchart that describes weight calculation processing performed in Step S32 in FIG. 17.

In Step S41, the white-point estimation section 47 sets a first region as the processing subject. For example, each of the plurality of regions segmented by the segmentation section 46 is assigned with an identification number, and the white-point estimation section 47 sets a region assigned with a 0-th identification number as the processing subject. Subsequently, the processing in Steps S42 and S43, the processing in Steps S44 to S46, and the processing in Steps S47 to S51 are performed in parallel, and furthermore, the processing in Steps S48 and S50 and the processing in Steps in S49 and S51 are performed in parallel.

In Step S42, the white-point estimation section 47 calculates an edge amount ratio for the region subjected to processing. The white-point estimation section 47 is able to calculate the edge amount ratio on the basis of edge information in the region calculated by a Canny edge detection method (Canny Edge) that is a method of extracting an edge. For example, as the edge amount ratio, it is possible to use a value obtained by summing up an edge judgement value within an edge in the unit of a pixel and dividing the sum by the total number of pixels.

In Step S43, from an edge amount ratio edgeRate that is calculated in Step S42, on the basis of an assumption that a region having a larger amount of edge includes a larger high-frequency component, the white-point estimation section 47 calculates edgeWeight that is a weight value on the basis of an edge amount, in accordance with the following expression (6). For example, as the edge amount ratio edgeRate is smaller, the edgeWeight that is a weight value on the basis of the edge amount is calculated to be closer to 1. It is to be noted that an edge factor edgeFactor used in the expression (6) is a value adjustable by the user via the control section 45.

[Expression 6]

$$edgeWeight = pow(1.0 - edgeRate, edgeFactor) \quad (6)$$

In Step S44, the white-point estimation section 47 calculates a ratio of a size of the region subjected to processing with respect to the image as a whole.

In Step S45, from sizeRate that is a region ratio calculated in Step S44, the white-point estimation section 47 calculates, in accordance with the following expression (7), sizeWeight that is a weight value on the basis of the region size. For example, as the region ratio sizeRate is smaller, the sizeWeight that is a weight value on the basis of the region size is calculated to be closer to 1. It is to be noted that a size factor sizeFactor that is used in the expression (7) is a value adjustable by the user via the control section 45.

[Expression 7]

$$SizeWeight = pow(1.0 - sizeRate, sizeFactor) \quad (7)$$

In Step S46, the white-point estimation section 47 calculates, with respect to the RGB value of the region subjected to processing, the average value used in the foregoing expression (1) or the maximum value in the foregoing expression (2).

In Step S47, the white-point estimation section 47 converts the color of the region subjected to processing from an SRGB color space into an $RGB_{Linear}$ color space, which is further converted into an XYZ color space, and then converted into xy coordinates in the xy-chromaticity diagram.

Figure 19:
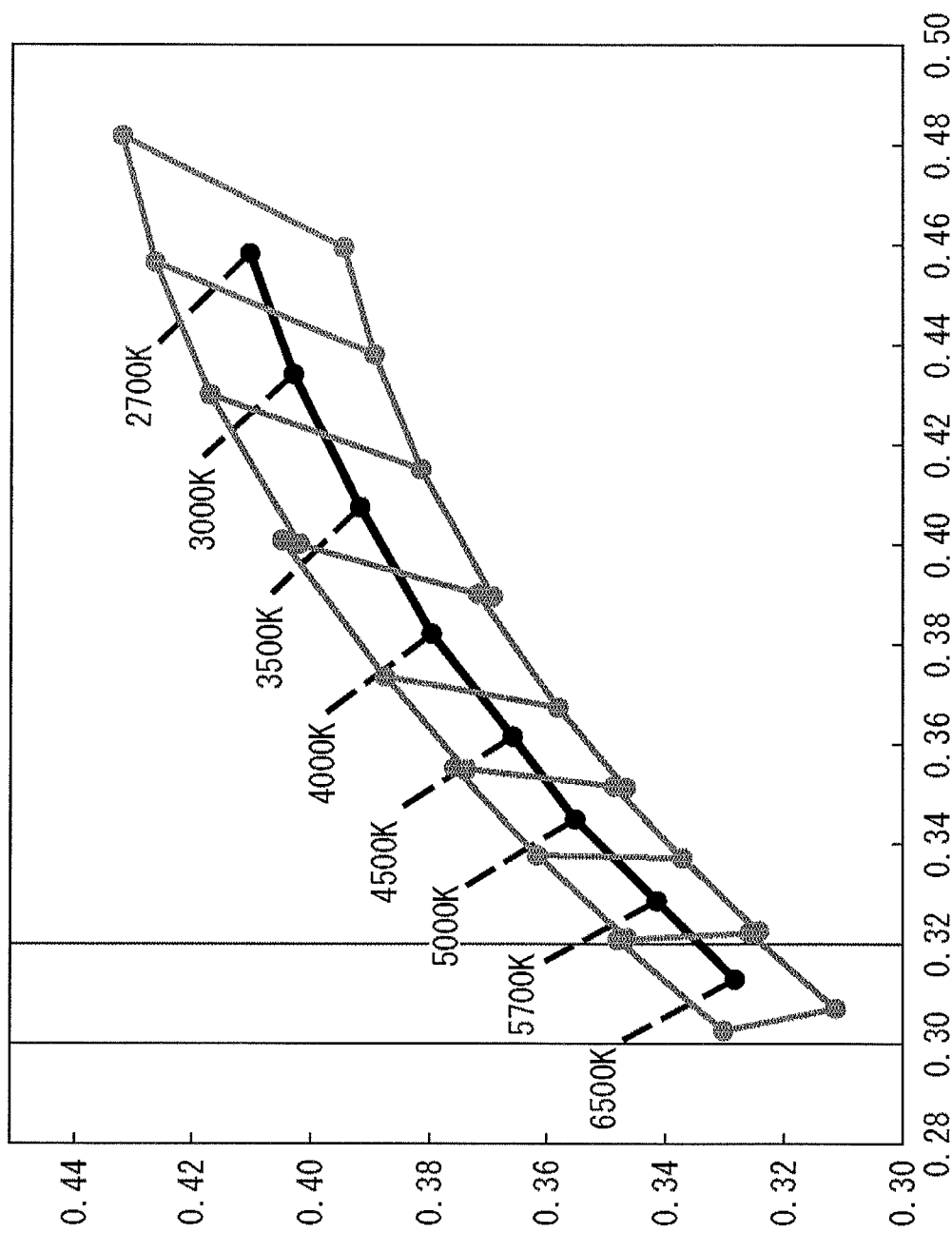
FIG. 19 is a diagram that illustrates a standard value related to chromaticity.

In Step S48, the white-point estimation section 47 calculates distFromWhiteLed that is a distance from a normal rectangle of a white LED (chromaticity 2700K to 6500K) with respect to the xy coordinates that represent the color of the region subjected to processing, in accordance with the following expression (8). It is to be noted that in calculating this distFromWhiteLed, it is possible to use a standard value related to the chromaticity defined by ANSI C78.377 as illustrated in FIG. 19.

[Expression 8]

$$distFromWhiteLed = \begin{cases} 1 & \text{Within normal Rectangle} \\ \text{Shortest distance from each normal Rectangle} & \text{Out of normal Rectangle} \end{cases} \quad (8)$$

In Step S49, the white-point estimation section 47 calculates, with respect to the xy coordinates that represent the color of the region subjected to processing, a distance distFromD65 from D65 that is a standard light source defined by the CIE (Commission internationale de l'eclairage), in accordance with the following expression (9).

[Expression 9]

$$distFromD65=\sqrt{(x-x_{D65})^2+(y-y_{d65})^2} \qquad (9)$$

In Step S50, the white-point estimation section 47 calculates a white-LED weight value stdLedWeight on the basis of the distance distFromWhiteLed calculated in Step S48, in accordance with the following expression (10). For example, as the distance distFromWhiteLed is smaller, the white-LED weight value stdLedWeight is calculated to be a value closer to 1. It is to be noted that a white-LED factor stdLedFactor that is used in the expression (10) is adjustable by the user via the control section 45.

[Expression 10]

$$stdLedWeight=pow(1.0-distFromWhiteLed, stdLedFactor) \qquad (10)$$

In Step S51, the white-point estimation section 47 calculates a standard-light-source weight value whiteWeight on the basis of the distance distFromD65 calculated in Step S49, in accordance with the following expression (11). For example, as the distance distFromD65 is smaller, the standard-light-source weight value whiteWeight is calculated to be a value closer to 1. It is to be noted that a standard light source WhiteFactor that is used in the expression (11) is a value adjustable by the user via the control section 45.

[Expression 11]

$$whiteWeight=pow(1.0-distFromD65, whiteFactor) \qquad (11)$$

Then, after the processing in Step S43, Step S46, Step S50, and Step S51, the processing proceeds to Step S52. In Step S52, in accordance with the following expression (12), the white-point estimation section 47 calculates a final weight value Weight for the region subjected to processing, on the basis of the edgeWeight that is a weight value on the basis of the edge amount and calculated in Step S43, the sizeWeight that is a weight value on the basis of the region size and calculated in Step S45, the white-LED weight value stdLedWeight calculated in Step S50, and the standard-light-source weight value whiteWeight calculated in Step S51.

[Expression 12]

$$Weight=edgeWeight \times sizeWeight \times stdWeight \times stdWeight \times whiteWeight \qquad (12)$$

In Step S53, the white-point estimation section 47 determines whether or not all the regions have been subjected to the processing, that is, whether or not processing has been repeated until a region identification number reaches the segmented region number n of regions segmented by the segmentation section 46.

In Step S53, in a case where it is determined that all the regions have not been subjected to the processing, the processing proceeds to Step S54, to repeat similar processing on a subsequent region as the processing subject (by incrementing the region identification number).

Whereas, in Step S53, in a case where it is determined that all the regions have been subjected to the processing, the weight calculation processing is finished.

Figure 20:
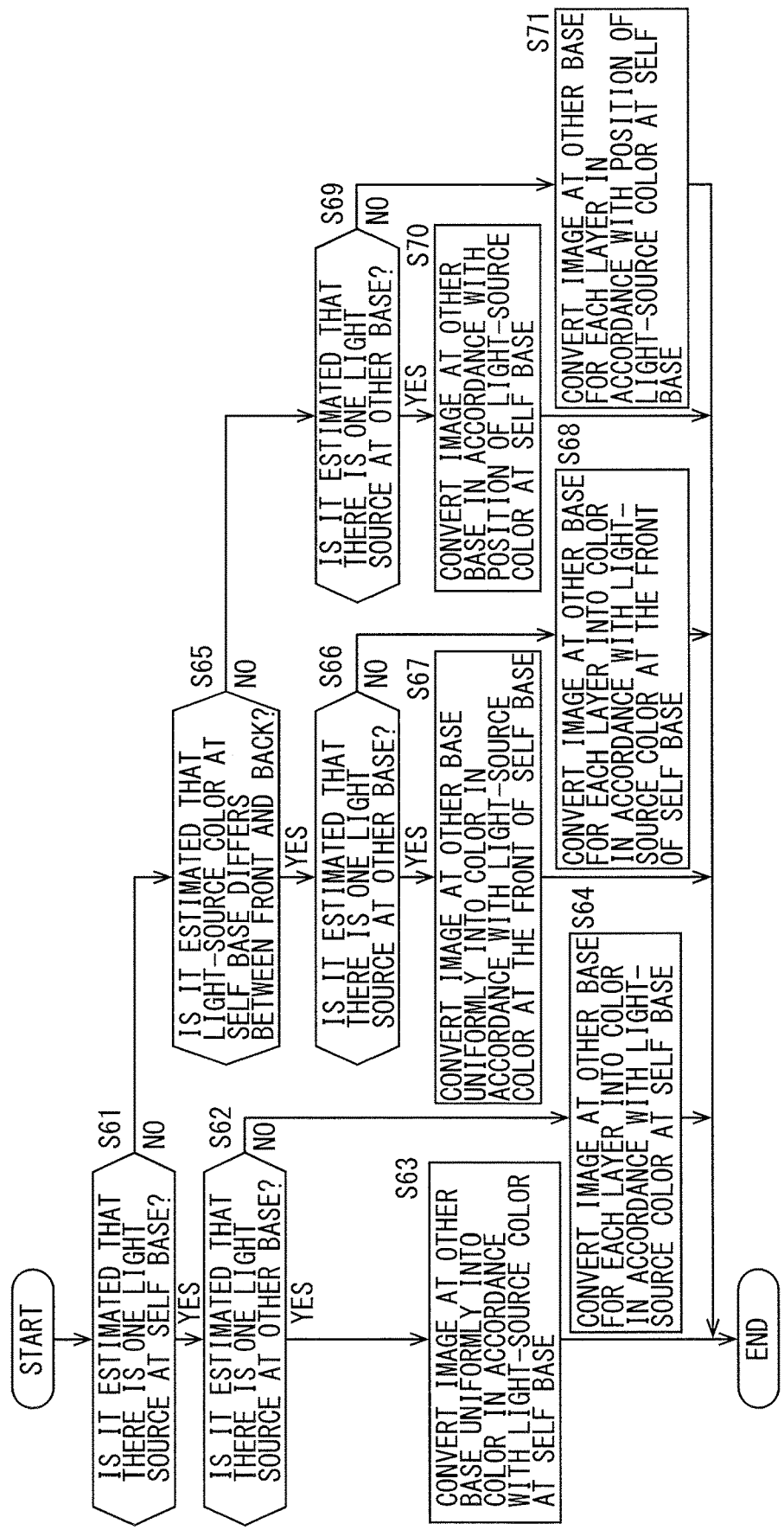
FIG. 20 is a flowchart that describes color correction processing.

Next, FIG. 20 is a flowchart that describes color correction processing performed in Step S20 in FIG. 16.

In Step S61, the color correction section 48 determines, in the result of the estimation in the light-source estimation processing in Step S14 in FIG. 16, whether or not it has been estimated that there is one light source at the self base.

In Step S61, in a case where the color correction section 48 determines that it has been estimated that there is one light source at the self base, the processing proceeds to Step S62. In Step S62, the color correction section 48 determines, in the result of the estimation in the light-source estimation processing in Step S18 in FIG. 16, whether or not it has been estimated that there is one light source at the other base.

In Step S62, in a case where the color correction section 48 determines that it has been estimated that there is one light source at the other base, the processing proceeds to Step S63. In Step S63, the color correction section 48 performs color correction to convert the image at the other base uniformly into a color in accordance with the light-source color at the self base. Thus, for example, as has been described with reference to FIG. 1, the color of the image as a whole at the other base is corrected to look as if the image is illuminated with the light source at the self base.

Whereas, in Step S62, in a case where the color correction section 48 determines that it has not been estimated that there is one light source at the other base, the processing proceeds to Step S64. In other words, in this case, it is estimated that there is a plurality of light sources at the other base, and in Step S64, the color correction section 48 performs color correction to convert, for each layer, the image at the other base into a color in accordance with the light-source color at the self base. Thus, for example, as has been described with reference to FIG. 9, out of the image at the other base, the color of a layer having a light-source color different from the light-source color at the self base is corrected to look as if the image is illuminated with the light source at the self base.

Meanwhile, in Step S61, in a case where the color correction section 48 determines that it has not been estimated that there is one light source at the self base, that is, the color correction section 48 determines that it has been estimated that there is a plurality of light sources at the self base, the processing proceeds to Step S65. In Step S65, the color correction section 48 determines, in the result of the estimation in the light-source estimation processing in Step S14 in FIG. 16, whether or not it has been estimated that the light-source color at the self base differs between front and back.

In Step S65, in a case where the color correction section 48 estimates that the light-source color at the self base differs between the front and the back, the processing proceeds to Step S66. In Step S66, the color correction section 48 determines, in the result of the estimation in the light-source estimation processing in Step S18 in FIG. 16, whether or not it has been estimated that there is one light source at the other base.

In Step S66, in a case where the color correction section 48 determines that it has been estimated that there is one light source at the other base, the processing proceeds to Step S67. In other words, in this case, it is estimated that the light-source color of the plurality of light sources at the self base differs between the front and the back and that there is one light source at the other base. In Step S67, the color correction section 48 performs color correction to convert the image at the other base uniformly into a color in accordance with the light-source color at the front of the self base. Thus, for example, as has been described with reference to FIG. 10, the color of the image as a whole at the other base is corrected to look as if the image is illuminated with the light source at the front of the self base.

Whereas, in Step S66, in a case where the color correction section 48 determines that it has not been estimated that there is one light source at the other base, the processing proceeds to Step S68. In other words, in this case, it is estimated that the light-source color of the plurality of light sources at the self base differs between the front and the back and that there is a plurality of light sources at the other base. In Step S68, the color correction section 48 performs color correction to convert, for each layer, the image at the other base into a color in accordance with the light-source color at the front of the self base. Thus, for example, as has been described with reference to FIG. 11, out of the image at the other base, the color of a layer having a light-source color different from the light-source color at the self base is corrected to look as if the layer is illuminated by the light source at the front of the self base.

Meanwhile, in Step S65, in a case where the color correction section 48 has been estimated that the light-source color at the self base does not differ between the front and the back, in this case, for example, the light-source color at the self base differs between top and bottom or between right and left, and the processing proceeds to Step S69. In Step S69, the color correction section 48 determines, in the result of the estimation in the light-source estimation processing in Step S18 in FIG. 16, whether or not it has been estimated that there is one light source at the other base.

In Step S69, in a case where the color correction section 48 determines that it has been estimated that there is one light source at the other base, the processing proceeds to Step S70. In other words, in this case, it is estimated that the light-source color of the plurality of light sources at the self base differs between top and bottom or between right and left and that there is one light source at the other base. In Step S70, the color correction section 48 performs color correction to convert the image at the other base into a color in accordance with the position of each light-source color at the self base. Thus, for example, as has been described with reference to FIG. 12, the color of the image as a whole at the other base is corrected in accordance with the position of each light-source color at the self base to look as if the image is illuminated with respective light-source colors.

Whereas, in Step S69, in a case where the color correction section 48 determines that it has been estimated that there is more than one light source at the other base, the processing proceeds to Step S71. In other words, in this case, it is estimated that the light-source color of the plurality of light sources at the self base differs between top and bottom or between right and left and that there is a plurality of light sources at the other base. In Step S71, the color correction section 48 performs color correction to convert, for each layer, the image at the other base into a color in accordance with the position of each light-source color at the self base. Thus, for example, as has been described with reference to FIG. 13, out of the image at the other base, the color of a layer having a light-source color different from the light-source color at the self base is corrected in accordance with the position of a corresponding light-source color at the self base to look as if each layer is illuminated with a corresponding light-source color.

Then, after the processing in Step S63, Step S64, Step S67, Step S68, Step S70, or Step S71, the color correction processing is finished.

As described above, the color correction section 48 is able to appropriately correct the color of image at the other base in accordance with the light-source color at the self base, on the basis of the number of light sources, the light-source color, the position of the light source, and so on at each of the self base and the other base.

<Second Configuration Example of Communication Processing Section>

Figure 21:
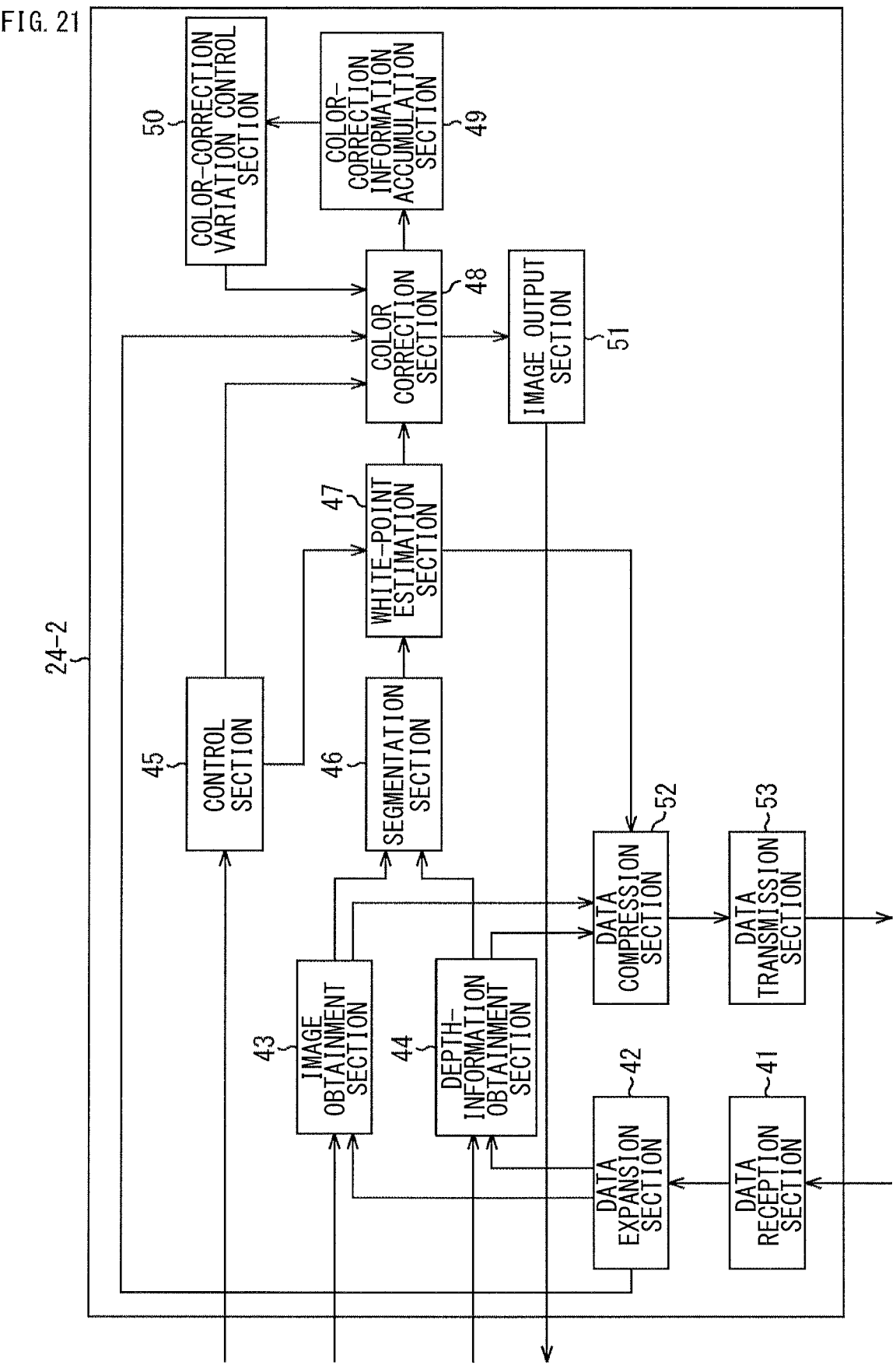
FIG. 21 is a block diagram that illustrates a second configuration example of a communication processing section.

FIG. 21 is a block diagram that illustrates a second configuration example of a communication processing section. It is to be noted that in a communication processing section 24-2 illustrated in FIG. 21, the same reference numeral is assigned to a configuration common to the communication processing section 24 in FIG. 3, and a detailed description thereof is omitted.

As illustrated in FIG. 21, as with the communication processing section 24 in FIG. 3, the communication processing section 24-2 includes the data reception section 41, the data expansion section 42, the image obtainment section 43, the depth-information obtainment section 44, the control section 45, the segmentation section 46, the white-point estimation section 47, the color correction section 48, the color-correction information accumulation section 49, the color-correction variation control section 50, the image output section 51, the data compression section 52, and the data transmission section 53.

Then, the communication processing section 24-2 is configured to transmit a result of an estimation of the white point at the self base along with an image and depth information at the self base, and receive a result of an estimation of the white point at the other base along with an image and depth information at the other base. In other words, the communication processing section 24-2 has a configuration in which the data expansion section 42 supplies the color correction section 48 with the result of the estimation of the white point that is transmitted from the other base, and the white-point estimation section 47 supplies the data compression section 52 with the result of the estimation of the white point from the image at the self base.

Accordingly, it is only necessary for the segmentation section 46 and the white-point estimation section 47 in the communication processing section 24-2 to perform processing that estimates the white point from the image at the self base, which makes it possible to reduce the processing as compared with the communication processing section 24 in FIG. 3.

<Third Configuration Example of Communication Processing Section>

FIG. 22 is a block diagram that illustrates a third configuration example of a communication processing section. It is to be noted that in a communication processing section 24-3 illustrated in FIG. 22, the same reference numeral is assigned to a configuration common to the communication processing section 24 in FIG. 3, and a detailed description thereof is omitted.

As illustrated in FIG. 22, the communication processing section 24-3 includes the data reception section 41, the data expansion section 42, the image obtainment section 43, the depth-information obtainment section 44, the control section 45, the color correction section 48, the color-correction information accumulation section 49, the color-correction variation control section 50, the image output section 51, the data compression section 52, and the data transmission section 53. In other words, as compared with the communication processing section 24 in FIG. 3, the communication processing section 24-3 does not include the segmentation section 46 and the white-point estimation section 47.

Then, in the remote communication system 11 that is configured by coupling thereto, the communication terminal 13 including the communication processing section 24-3, it is necessary to couple, to the network 12, the server 14 that includes at least the segmentation section 46 and the white-point estimation section 47. In other words, the remote communication system 11 thus configured is configured to cause the server 14 to intensively perform the processing that estimates the white point from the image.

Accordingly, the communication processing section 24-3 is configured to transmit the image and depth information at the self base to the server 14, and receive the result of the estimation of the white point at the other base that is transmitted from the server 14 along with the image and depth information at the other base. In other words, the communication processing section 24-3 has a configuration in which the data expansion section 42 supplies the color correction section 48 with the result of the estimation of the white point at the other base that is transmitted from the server 14.

Accordingly, when the image and depth information are transmitted from one base, the server 14 is able to perform processing that estimates the white point from the image, and transmits the result of the estimation to the other base along with the image and depth information. In other words, in the remote communication system 11 that is configured by coupling thereto, the communication terminal 13 including the communication processing section 24-3, the communication terminals 13 that perform remote communication are indirectly coupled to each other via the server 14.

Thus, in the remote communication system 11, it is only necessary to perform processing that estimates the white point from an image somewhere in the system, and it is not necessary to provide a configuration that estimates the white point from an image in the remote communication system 11. This allows the communication processing section 24-3 to reduce the processing as compared with the communication processing section 24 in FIG. 3. Accordingly, for example, performing processing that estimates the white point from the image in the server 14 makes it possible to perform remote communication using an image that produces a sense of presence even if the communication terminal 13 has a low processing capacity.

As described above, the remote communication system 11 according to the present embodiment makes it possible to perform color correction processing that corrects the color of the image at the other base in real time (on a per frame basis) in accordance with the light-source color at the self base. This allows each user to use the image in a color tone that is automatically adjusted to the lighting environment of each user's own room, thus making it possible to perform, for example, satisfactory remote communication as if in the same space.

Accordingly, as compared with a system that performs a uniform color correction on the image as a whole, the remote communication system 11 is able to perform natural color correction without causing unnaturalness even when a plurality of light sources is provided at each base. In addition, the remote communication system 11 is able to alter color correction in conjunction with a change in the lighting environment. Therefore, for example, even if there is a change in illumination light during remote communication, it is possible to follow the change in real time. Furthermore, the remote communication system 11 is able to heighten the sense as if each space is continuous by performing color correction for each layer or performing adjustment of the correction amount in accordance with the depth, thus making it possible to heighten the sense as if each space is continuous. This makes it possible for the remote communication system 11 to provide a more satisfactory user experience.

<Configuration Example of Computer>

It is to be noted that each processing described with reference to the foregoing flowchart need not necessarily be processed in time series in an order described as a flowchart, and includes processing that is performed in parallel or separately (for example, processing by parallel processing or processing by object). In addition, the program may be processed by a single CPU or may be processed by a plurality of CPUs in a distributed manner.

In addition, it is possible to execute the foregoing series of processing (image processing method) by hardware or to execute by software. In a case of executing the series of processing by software, the program is installed from a program recording medium on which the program is recorded, onto a computer in which the program included in the software is incorporated in a dedicated hardware or, for example, a general-purpose computer or the like that enables execution of each type of function through installation of each type of program.

Figure 23:
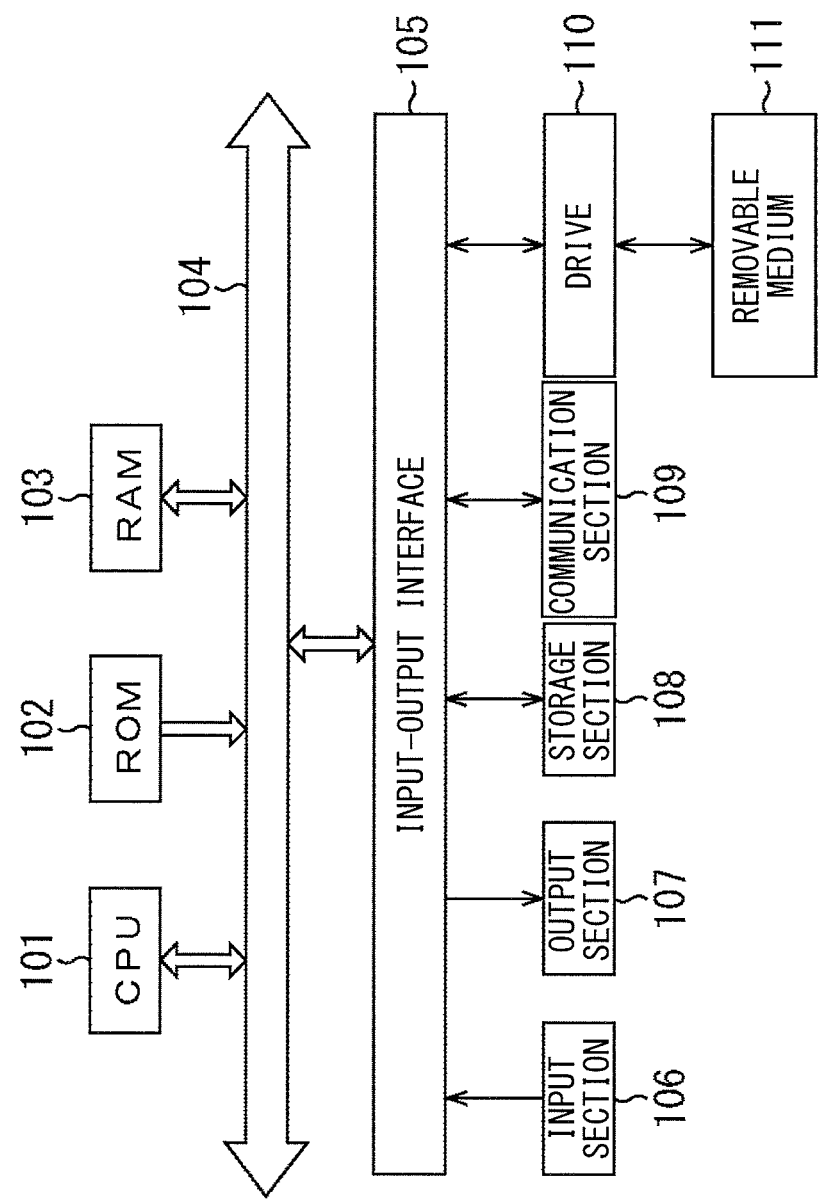
FIG. 23 is a block diagram that illustrates a configuration example of an embodiment of a computer to which the present technology is applied.

FIG. 23 is a block diagram that illustrates a configuration example of a computer hardware that executes the foregoing series of processing by program.

In the computer, a CPU (Central Processing Unit) 101, a ROM (Read Only Memory) 102, and a RAM (Random Access Memory) 103 are coupled to each other by a bus 104.

Furthermore, to the bus 104, an input-output interface 105 is coupled. To the input-output interface 105, coupled are an input section 106 that includes a keyboard, a mouse, a microphone, and the like, an output section 107 that includes a display, a speaker, and the like, a storage section 108 that includes a hard disk, a nonvolatile memory, and the like, a communication section 109 that includes a network interface, and the like, and a drive 110 that drives a removable medium 111 such as a magnetic disk, an optical disk, a magneto-optical disk, or a semiconductor memory.

In the computer configured as described above, for example, the foregoing series of processing is performed by the CPU 101 loading a program held in the storage section 108 to the RAM 103 via the input-output interface 105 and the bus 104 and executing the program.

For example, the program to be executed by the computer (CPU 101) is recorded and provided on the removable medium 111 that is a package medium including a magnetic disk (including a flexible disk), an optical disk (such as a CD-ROM (Compact Disc-Read Only Memory) or a DVD (Digital Versatile Disc)), a magneto-optical disk, or a semiconductor memory, and the like, or provided via a wired or wireless transmission medium such as a local area network, the Internet, or digital satellite broadcasting.

Then, it is possible to install the program in the storage section 108 via the input-output interface 105 by mounting the removable medium 111 onto the drive 110. In addition, it is possible to install the program in the storage section 108 by receiving the program at the communication section 109 via a wired or wireless transmission medium. Other than that, it is possible to previously install the program on the ROM 102 or the storage section 108.

<Example of Combination of Configurations>

It is to be noted that the present technology may also have the following configuration.

(1)

An image processor, including:

a region segmentation section that segments, in remote communication using an image received and transmitted between another base and a self base, the image at the other base into a plurality of regions;

an estimation section that estimates, by performing an image analysis, a lighting environment in which the image at the other base has been captured, the image analysis being performed on the image as a whole at the other base and on each of the plurality of regions in the image at the other base; and a color correction section that performs color correction on the image at the other base in accordance with a light-source color at the self base, the image at the other base having a light-source color corresponding to the lighting environment.

(2)

The image processor according to (1), in which the region segmentation section segments an image at the self base into a plurality of regions, the estimation section estimates, by performing an image analysis, a lighting environment in which the image at the self base has been captured, the image analysis being performed on a whole at the self base and on each of the plurality of regions in the image at the self base, and the color correction section performs color correction on the image at the other base in accordance with the light-source color in the lighting environment at the self base, the lighting environment being estimated by the estimation section.

(3)

The image processor according to (1) or (2), in which the color correction section performs color correction on the image at the other base in a unit of a frame, and in a case of a change in the lighting environment estimated by the estimation section, alters, in accordance with the change, the color correction performed on the image at the other base.

(4)

The image processor according to any one of (1) to (3), further including:

an accumulation section that accumulates a correction amount as color correction information, the correction amount being used by the color correction section when performing the color correction on the image at the other base; and a color correction control section that performs control of the correction amount with reference to the color correction information accumulated in the accumulation section, the correction amount being used by the color correction section when performing the color correction on the image at the other base.

(5)

The image processor according to any one of (1) to (4), in which the color correction section performs adjustment using depth information in an imaging range in which the image at the other base is captured, the adjustment being performed to increase a color correction amount in the color correction with respect to a front side of the image at the other base in accordance with the light-source color at the self base while decreasing the color correction amount with respect to a back side of the image at the other base.

(6)

The image processor according to any one of (2) to (5), in which the region segmentation section separates the image at the self base or the other base into a plurality of layers, using depth information in an imaging range in which the image at the self base or the other base is captured.

(7)

The image processor according to any one of (2) to (5), in which the region segmentation section segments the image at the self base or the other base into the plurality of regions, using mask information masking an object included in the image at the self base or the other base.

(8)

The image processor according to any one of (2) to (7), in which the estimation section, using a weight value calculated for each of the plurality of regions at the self base or the other base, estimates a white point in the image as a whole at the self base or the other base and also estimates a white point for each of the plurality of layers at the self base or the other base, to thereby estimate the lighting environment at the self base or the other base.

(9)

The image processor according to any one of (2) to (6), in which the estimation section estimates a white point in an image as a whole at the self base or the other base, and also separates the image at the self base or the other base into a plurality of layers and estimates a white point for each of the plurality of layers, to estimate the number of light sources at the self base or the other base on a basis of a result of the estimation of the white point in the image as a whole at the self base or the other base and a result of the estimation of the white point for each of the plurality of layers at the self base or the other base, and the color correction section performs color correction on the image at the other base in accordance with the number of light sources at the self base or the other base, the number being estimated by the estimation section.

(10)

The image processor according to (9), in which in a case where the estimation section estimates that there is one light source at the self base and that there is one light source at the other base, the color correction section performs color correction that uniformly converts the image at the other base in accordance with the light-source color at the self base.

(11)

The image processor according to (9), in which in a case where the estimation section estimates that there is one light source at the self base and that there is a plurality of light sources at the other base, the color correction section performs color correction that converts, for each of the plurality of layers, the image at the other base in accordance with the light-source color at the self base.

(12)

The image processor according to (9), in which in a case where the estimation section estimates that there is a plurality of light sources having a same light-source color at the self base and that there is one light source at the other base, the color correction section performs color correction that uniformly converts the image at the other base in accordance with the light-source color at a front side of the self base.

(13)

The image processor according to (9), in which in a case where the estimation section estimates that there is a plurality of light sources having a same light-source color at the self base and that there is a plurality of light sources at the other base.

the color correction section performs color correction that converts, for each of the plurality of layers, the image at the other base in accordance with the light-source color at a front side of the self base.

(14)

The image processor according to (9), in which in a case where the estimation section estimates that there is a plurality of light sources each having a different light-source color at the self base and that there is one light source at the other base, the color correction section performs color correction that coverts the image at the other base in accordance with a position of each of the plurality of light sources at the self base.

(15)

The image processor according to (9), in which in a case where the estimation section estimates that there is a plurality of light sources each having a different light-source color at the self base and that there is a plurality of light sources at the other base, the color correction section performs color correction that converts the image at the other base for each of the plurality of layers, in accordance with a position of a corresponding one of the plurality of light sources at the self base.

(16)

An image processing method used in an image processor that processes an image in remote communication using the image received and transmitted between another base and self base, the image processing method including:

segmenting the image at the other base into a plurality of regions;

estimating, by performing an image analysis, a lighting environment in which the image at the other base has been captured, the image analysis being performed on the image as a whole at the other base and on each of the plurality of regions in the image at the other base; and performing color correction on the image at the other base in accordance with the light-source color at the self base, the image at the other base having a light-source color corresponding to the lighting environment.

(17)

A program causing a computer in an image processor to execute image processing, the image processor processing an image in remote communication using the image received and transmitted between another base and a self base, the image processing including:

segmenting the image at the other base into a plurality of regions, estimating, by performing an image analysis, a lighting environment in which the image at the other base has been captured, the image analysis being performed on the image as a whole at the other base and on each of the plurality of the regions in the image at the other base, and performing color correction on the image at the other base in accordance with the light-source color at the self base, the image at the other base having a light-source color corresponding to the lighting environment.

(18)

A remote communication system including an image processor, the image processor being coupled to the remote communication system via a network and including:

a reception-transmission section that receives and transmits an image between another base and a self base, and a color correction section that performs color correction in remote communication using the image received and transmitted, the color correction being performed on the image at the other base in accordance with a light-source color at the self base, the image at the other base having a light-source color corresponding to a lighting environment in which the image at the other base has been captured, the lighting environment being estimated by segmenting the image at the other base into a plurality of regions and then performing an image analysis on the image as a whole at the other base and on each of the plurality of regions in the image at the other base.

It is to be noted that the present embodiments are not limited to the foregoing embodiments, and various alterations are possible without departing from the scope of the present disclosure. In addition, the effects described herein are merely illustrative and not limitative, and may have other effects.

REFERENCE NUMERALS LIST 11 remote communication system
12 network
13 communication terminal
14 server
21 RGB sensor
22 depth sensor
23 display apparatus
24 communication processing section
31 and 32 lighting device
41 data reception section
42 data expansion section
43 image obtainment section
44 depth-information obtainment section
45 control section
46 segmentation section
47 white-point estimation section
48 color correction section
49 color-correction information accumulation section
50 color-correction variation control section
51 image output section
52 data compression section
53 data transmission section

The invention claimed is:

1. An image processor, comprising:
circuitry configured to
acquire a first-place image representing a first place and a second-place image representing a second place that is a remote place apart from the first place,
segment the second-place image into a plurality of second-place segmentation regions,
calculate a first-place lighting parameter of the first place in accordance with the first-place image,
calculate respective second-place lighting parameters of the second-place segmentation regions in accordance with the second-place segmentation regions,
correct each color of the second-place segmentation regions in accordance with the first-place lighting parameter and a corresponding one of the second-place lighting parameters, and
send a corrected second-place image including the corrected second-place segmentation regions to a display device at the first place.

2. The image processor according to claim 1,
wherein the circuitry is further configured to
segment the first-place image into first-place segmentation regions,
estimate a first-place lighting environment in accordance with the first-place segmentation regions, and
correct each color of the second-place segmentation regions in accordance with the first-place lighting environment and the corresponding one of the second-place lighting parameters.

3. The image processor according to claim 1, wherein the circuitry corrects each color of the second-place segmentation regions in a unit of a frame in accordance with a change of second-place lighting parameters.

4. The image processor according to claim 3, wherein the circuitry is further configured to
accumulate, in the unit of the frame, a correction amount in the correction for each color of the second-place segmentation regions, and
correct each color of the second-place segmentation regions in a next frame in accordance with the accumulated correction amount.

5. The image processor according to claim 1, wherein the circuitry is further configured to
acquire depth information representing the second place,
segment, in accordance with the depth information, the second-place image into a front segmentation region and a back segmentation region, and
set, in accordance with the first-place lighting parameter, a color correction amount of the front segmentation region to be larger than a color correction amount of the back segmentation region.

6. The image processor according to claim 1, wherein the circuitry is further configured to
acquire depth information representing the second place,
segment, in accordance with the depth information, the second place into a plurality of layers as the second-place segmentation regions,
estimate respective white points in the plurality of layers, and
correct each color of the plurality of layers in accordance with a corresponding one of the white points.

7. The image processor according to claim 1, wherein the circuitry is further configured to
acquire mask information masking a human object included in the second-place image, and
segment, in accordance with the mask information, the second-place image into the second-place segmentation regions.

8. The image processor according to claim 6, wherein the circuitry is further configured to
calculate respective weight values for the plurality of layers, and
estimate the respective white points in the plurality of layers in accordance with the respective weight values.

9. The image processor according to claim 6, wherein the circuitry is further configured to
estimate the number of light sources in the second place in accordance with the white points, and
correct each color of the plurality of layers in accordance with the number of light sources.

10. The image processor according to claim 1, wherein the circuitry is further configured to
determine, in accordance with the first-place lighting parameter and the second-place lighting parameters, whether there is one light source at the first place and whether there is one light source at the second place, and
uniformly convert, based on the determination that there is the one light source at the first place and there is the one light source at the second place, the second-place image in accordance with a color of the light source at the first place.

11. The image processor according to claim 1, wherein the circuitry is further configured to
determine, in accordance with the first-place lighting parameter and the second-place lighting parameters, whether there is one light source at the first place and whether there is a plurality of light sources at the second place, and
convert, based on the determination that there is the one light source at the first place and there is the plurality of light sources at the second place, each second-place segmentation region of the second-place image in accordance with a color of the light source at the first place.

12. The image processor according to claim 1, wherein the circuitry is further configured to
determine, in accordance with the first-place lighting parameter and the second-place lighting parameters, whether there is a plurality of light sources at the first place and whether there is one light source at the second place, and
uniformly convert, based on the determination that there is the plurality of light sources at the first place and there is the one light source at the second place, the second-place image in accordance with a color of one of the plurality of light sources at a front side of the first place.

13. The image processor according to claim 1, wherein the circuitry is further configured to
determine, in accordance with the first-place lighting parameter and the second-place lighting parameters, whether there is a plurality of light sources at the first place and whether there is a plurality of light sources at the second place, and
convert, based on the determination that there is the plurality of light sources at the first place and there is the plurality of light sources at the second place, each second-place segmentation region of the second-place image in accordance with a color of one of the plurality of light sources at a front side of the first place.

14. The image processor according to claim 1, wherein the circuitry is further configured to
determine, in accordance with the first-place lighting parameter and the second-place lighting parameters, whether there is a plurality of light sources having different colors at the first place and whether there is one light source at the second place, and
convert, based on the determination that there is the plurality of light sources having the different colors at the first place and there is the one light source at the second place, the second-place image in accordance with a position of each of the plurality of light sources at the first place.

15. The image processor according to claim 1, wherein the circuitry is further configured to
determine, in accordance with the first-place lighting parameter and the second-place lighting parameters, whether there is a plurality of light sources having different colors at the first place and whether there is a plurality of light sources at the second place, and
convert, based on the determination that there is the plurality of light sources having the different colors at the first place and there is the plurality of light sources at the second place, the second-place image in accordance with a position of a corresponding one of the plurality of light sources at the first place.

16. An image processing method used in an image processor that processes an image in remote communication using the image received and transmitted between another base and self base, the image processing method comprising:
acquiring a first-place image representing a first place and a second-place image representing a second place that is a remote place apart from the first place;
segmenting the second-place image into a plurality of second-place segmentation regions;
calculating a first-place lighting parameter of the first place in accordance with the first-place image;
calculating respective second-place lighting parameters of the second-place segmentation regions in accordance with the second-place segmentation regions;
correcting each color of the second-place segmentation regions in accordance with the first-place lighting parameter and a corresponding one of the second-place lighting parameters; and
sending a corrected second-place image including the corrected second-place segmentation regions to a display device at the first place.

17. A non-transitory computer-readable storage medium having embodied thereon a program, which when executed by a computer causes an image processor of the computer to execute an image processing method, the image processing method comprising:
acquiring a first-place image representing a first place and a second-place image representing a second place that is a remote place apart from the first place;
segmenting the second-place image into a plurality of second-place segmentation regions;
calculating a first-place lighting parameter of the first place in accordance with the first-place image;
calculating respective second-place lighting parameters of the second-place segmentation regions in accordance with the second-place segmentation regions;
correcting each color of the second-place segmentation regions in accordance with the first-place lighting parameter and a corresponding one of the second-place lighting parameters; and
sending a corrected second-place image including the corrected second-place segmentation regions to a display device at the first place.

18. A remote communication system including an image processor, the image processor being coupled to the remote communication system via a network and comprising:
circuitry configured to
receive a first-place image representing a first place and a second-place image representing a second place that is a remote place apart from the first place,
transmit the first-place image and the second-place image, wherein the transmitted second-place image is segmented into a plurality of second-place segmentation regions,
calculate a first-place lighting parameter of the first place in accordance with the first-place image,
calculate respective second-place lighting parameters of the second-place segmentation regions in accordance with the second-place segmentation regions, and
correct each color of the second-place segmentation regions in accordance with the first-place lighting parameter and a corresponding one of the second-place lighting parameters.

* * * * *